US008739185B2

(12) United States Patent
Isoyama

(10) Patent No.: US 8,739,185 B2
(45) Date of Patent: May 27, 2014

(54) EVENT PROCESSING SYSTEM, AN EVENT PROCESSING METHOD, A RULE DISTRIBUTION DEVICE AND A RULE DISTRIBUTION PROGRAM

(75) Inventor: Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 13/139,708

(22) PCT Filed: Dec. 10, 2009

(86) PCT No.: PCT/JP2009/071009
§ 371 (c)(1),
(2), (4) Date: Jun. 14, 2011

(87) PCT Pub. No.: WO2010/071162
PCT Pub. Date: Jun. 24, 2010

(65) Prior Publication Data
US 2011/0252433 A1    Oct. 13, 2011

(30) Foreign Application Priority Data

Dec. 15, 2008  (JP) ................................. 2008-318067

(51) Int. Cl.
*G06F 9/46* (2006.01)
(52) U.S. Cl.
USPC ........................................................ 719/318

(58) Field of Classification Search
None
See application file for complete search history.

(56) References Cited

U.S. PATENT DOCUMENTS

| 6,862,619 B1 | 3/2005 | Sugauchi et al. |
| 7,856,634 B2 | 12/2010 | Satou et al. |
| 2007/0220305 A1* | 9/2007 | Isoyama ........................... 714/4 |

FOREIGN PATENT DOCUMENTS

| JP | 2001-84195 A | 3/2001 |
| JP | 2006-92291 A | 4/2006 |
| JP | 2007-52562 A | 3/2007 |
| JP | 4161998 B2 | 8/2008 |

* cited by examiner

*Primary Examiner* — H S Sough
*Assistant Examiner* — William C Wood
(74) *Attorney, Agent, or Firm* — McGinn IP Law Group, PLLC

(57) ABSTRACT

An event processing system which, even if large quantities of processing requests are generated from applications, may suppress the load growth of setting of a processing rule and a dispatch rule in event processing distribution, includes a plurality of local systems which receive an event from an event source and send a processing result of the event to an application server, and a dispatch rule distribution server which distributes a dispatch rule to the local systems. When receiving a processing rule from the application server, the local system generates the dispatch rule including own local system as a dispatch destination of the event.

22 Claims, 29 Drawing Sheets

Fig.7

204 PROCESSING RULE SETTING INFORMATION

| PROCESSING SERVER IDENTIFIER | PROCESSING RULE |
|---|---|
| PS11 | PR1,PR3,PR6 |
| PS12 | PR2,PR4,PR7 |
| PS13 | PR5 |

Fig.8

| DISPATCH RULE IDENTIFIER | CONTENTS | |
|---|---|---|
| | EVENT CONDITION | DISPATCH DESTINATION |
| DR1 | (EVENT SOURCE TYPE = RFID) & (TAG ID = 1) | LS1/PS11 |
| DR2 | (EVENT SOURCE TYPE = RFID) & (TAG ID = 2) | LS1/PS12 |

205 DISPATCH RULE

Fig.14

208 EVENT SOURCE MANAGEMENT INFORMATION (LS1)

| EVENT SOURCE TYPE | EVENT SOURCE IDENTIFIER |
|---|---|
| RFID | G11 |
| RFID | G12 |
| TEMPERATURE | G13 |

208 EVENT SOURCE MANAGEMENT INFORMATION (LS2)

| EVENT SOURCE TYPE | EVENT SOURCE IDENTIFIER |
|---|---|
| RFID | G21 |
| RFID | G22 |

208 EVENT SOURCE MANAGEMENT INFORMATION (LS3)

| EVENT SOURCE TYPE | EVENT SOURCE IDENTIFIER |
|---|---|
| RFID | G31 |
| RFID | G32 |
| TEMPERATURE | G33 |

Fig.16

205 DISPATCH RULE

| DISPATCH RULE IDENTIFIER | CONTENTS | |
|---|---|---|
| | EVENT CONDITION | DISPATCH DESTINATION |
| DR3 | (EVENT SOURCE TYPE = RFID) & (EVENT SOURCE IDENTIFIER = G11) | LS1/PS11 |
| DR4 | (EVENT SOURCE TYPE = RFID) & (EVENT SOURCE IDENTIFIER = G21) | LS1/PS12 |

207 LOCAL SYSTEM MANAGEMENT INFORMATION (DS1)

| LOCAL SYSTEM IDENTIFIER | EVENT SOURCE TYPE | EVENT SOURCE IDENTIFIER |
|---|---|---|
| LS1 | RFID | G11 |
| | RFID | G12 |
| | TEMPERATURE | G13 |
| LS2 | RFID | G21 |
| | RFID | G22 |
| LS3 | RFID | G31 |
| | RFID | G32 |
| | TEMPERATURE | G33 |

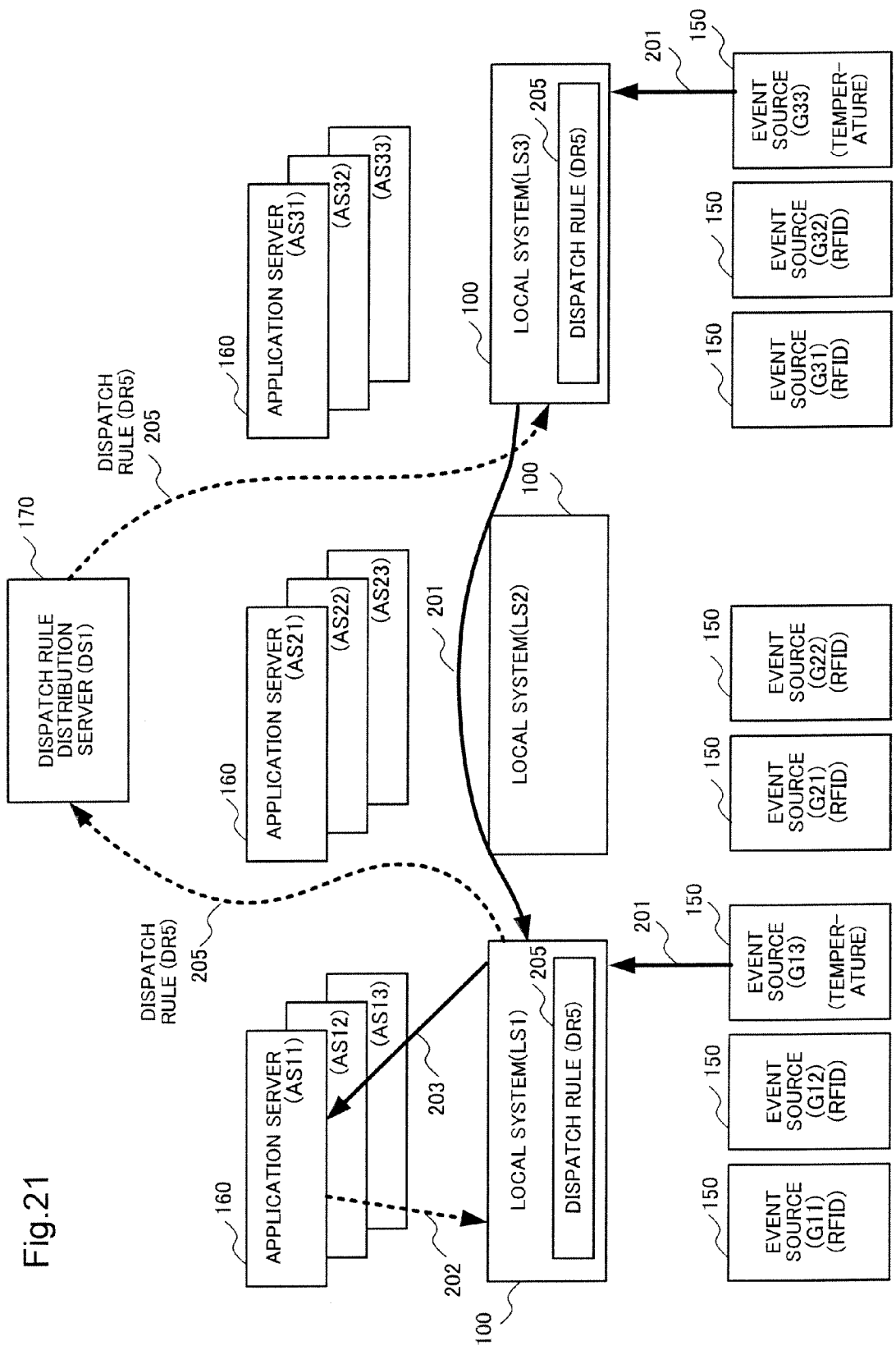

Fig.22

208 EVENT SOURCE MANAGEMENT INFORMATION(LS1)

| EVENT SOURCE TYPE | EVENT SOURCE IDENTIFIER |
|---|---|
| TEMPERATURE | G1.0 |
| TEMPERATURE | G1.1 |
| TEMPERATURE | G1.2 |

208 EVENT SOURCE MANAGEMENT INFORMATION(LS2)

| EVENT SOURCE TYPE | EVENT SOURCE IDENTIFIER |
|---|---|
| TEMPERATURE | G2.0 |
| TEMPERATURE | G2.1 |
| TEMPERATURE | G2.2 |

208 EVENT SOURCE MANAGEMENT INFORMATION(LS3)

| EVENT SOURCE TYPE | EVENT SOURCE IDENTIFIER |
|---|---|
| TEMPERATURE | G3.0 |
| TEMPERATURE | G3.1 |
| TEMPERATURE | G3.2 |

Fig.28

209 FORWARDING RULE INFORMATION (LS)

| SCOPE | FORWARD TO DISTRIBUTION SERVER |
|---|---|
| LOCAL | NO |
| WITHIN AREA | YES |
| ALL AREAS | YES |

Fig.29

210 FORWARDING RULE INFORMATION (DS1, DS2, DS3)

| SCOPE | FORWARD TO UPPER LEVEL DISTRIBUTION SERVER |
|---|---|
| WITHIN AREA | NO |
| ALL AREAS | YES |

EVENT PROCESSING SYSTEM, AN EVENT PROCESSING METHOD, A RULE DISTRIBUTION DEVICE AND A RULE DISTRIBUTION PROGRAM

TECHNICAL FIELD

The present invention relates to an event processing system, an event processing method, a rule distribution device and a rule distribution program and, in particular, relates to an event processing system, an event processing method, a rule distribution device and a rule distribution program which process a large number of events generated in a device such as RFID (Radio Frequency Identification) or a sensor.

BACKGROUND ART

An example of a system to process a large number of events which is generated in a device and so on is disclosed in Japanese Patent Publication No. 4161998. A load distribution system of Japanese Patent Publication No. 4161998 is shown in FIG. 32. Referring to FIG. 32, the load distribution system includes an event processing distribution device 501, an event dispatch device 502 and a plurality of event processing servers 503. An application 504 which requests event processing sends an event processing rule to the event processing distribution device 501 (arrow 511). The event processing distribution device 501 which has received the event processing rule sets the event processing rule to the event processing server 503 (arrow 512) in such a way that a load of the event processing server 503 is balanced equally and event processing of the same events is performed by the same server.

For example, in an RFID system, in case the application 504 needs to detect all RFID tags of all components required in order to produce a product, the application 504 generates and sends a processing rule which says "if RFID tags of all components of the product are detected, notify the application" to the event processing distribution device 501. The event processing distribution device 501 sets this processing rule to, for example, the event processing server 503a.

The event processing distribution device 501 sets an event dispatch rule to the event dispatch device 502 (arrow 513) in such a way that an event to be processed is dispatched to the event processing server to which the processing rule for the event is set.

In case of the example indicated above, the event processing distribution device 501 sets an event dispatch rule which says "dispatch a detected event for an RFID tag of the component of the product to the processing server 503a" to the event dispatch device 502.

As a result, an event which is generated from an event source 505 such as a device is dispatched from the event dispatch device 502 to the event processing server 503 to which a processing rule for the event is set (arrows 514 and 515). The event processing server 503 processes the event based on the event processing rule and notifies the application 504 of a processing result (arrow 516).

SUMMARY OF INVENTION

Technical Problem

In a load distribution system disclosed in Japanese Patent Publication No. 4161998, the event processing distribution device needs to accept a processing request from the plurality of applications and perform decision of a processing server to which an event processing rule is set, setting of the event processing rule to the event processing server, generation of an event dispatch rule, and setting of the event dispatch rule to the event dispatch device. For this reason, in a large-scale system in which a lot of applications exist and large quantities of processing requests are generated from these applications, there is a problem that a load of the above-mentioned processing performed by the event processing dispersion device becomes high, and affects processing performance of the system.

The object of the present invention is to solve the problem mentioned above and to provide an event processing system, an event processing method, a rule distribution device and a rule distribution program which can, even if large quantities of processing requests are generated from applications, suppress the load growth of setting of a processing rule and a dispatch rule in event processing distribution.

Solution to Problem

An event processing system according to an exemplary aspect of the invention includes a plurality of local systems which receive an event from an event source and send a processing result of the event to an application server, and a dispatch rule distribution server which distributes a dispatch rule to the local system, wherein each of the plurality of local systems, when receiving a processing rule including an event condition which indicates a condition of the event to be processed from the application server, generates the dispatch rule including own local system as a dispatch destination of the event which matches the event condition and sends the dispatch rule to the dispatch rule distribution server, when receiving the event which matches the event condition included in the dispatch rule received from the dispatch rule distribution server from the event source, refers to the dispatch rule and dispatches the event to other the local system which matches the dispatch destination in case the dispatch destination corresponding to the event condition is not own local system, and when receiving the event of which the dispatch destination included in the dispatch rule is own local system from the event source or other local system, processes the event according to the processing rule and notifies the application server which is a sender of the processing rule of a processing result of the event, and the dispatch rule distribution server, when receiving the dispatch rule from one of the plurality of local systems, forwards the dispatch rule to other local system being subordinate.

An event processing system according to an exemplary aspect of the invention includes a plurality of local systems, and a dispatch rule distribution server which distributes a dispatch rule to the local system, wherein a first local system among the plurality of local systems, when receiving a processing rule including an event condition which indicates a condition of an event to be processed from an application server, generates the dispatch rule which including the first local system as a dispatch destination of the event which matches the event condition and sends the dispatch rule to the dispatch rule distribution server, and when receiving the event of which the dispatch destination included in the dispatch rule is the first local system from a second local system among the plurality of local systems, processes the event according to the processing rule and notifies the application server which is a sender of the processing rule of a processing result of the event, the second local system, when receiving the event which matches the event condition included in the dispatch rule received from the dispatch rule distribution server from an event source, refers to the dispatch rule and dispatches the event to the first local system being the dispatch destination which corresponds to the event condition, and the dispatch rule distribution server, when receiving the dispatch rule from the first local system, forwards the dispatch rule to the second local system.

A rule distribution device according to an exemplary aspect of the invention includes a processing rule setting unit which, when receiving a processing rule including an event condition which indicates a condition of an event to be processed from an application server, sets the processing rule to a processing server, and a dispatch rule setting unit which generates and sends a dispatch rule including the processing server as a dispatch destination of the event which matches the event condition to a dispatch rule distribution server, and sets the generated dispatch rule or the dispatch rule received from the dispatch rule distribution server to a dispatcher.

An event processing method according to an exemplary aspect of the invention includes a rule distribution step which, in a local system, when receiving a processing rule including an event condition which indicates a condition of an event to be processed from an application server, generates a dispatch rule including own local system as a dispatch destination of the event which matches the event condition and sends the dispatch rule to a dispatch rule distribution server, a first rule forwarding step which, in the dispatch rule distribution server, when receiving the dispatch rule from one of a plurality of the local systems, forwards the dispatch rule to other local system being subordinate, an event dispatching step which, in the local system, when receiving the event which matches the event condition included in the dispatch rule received from the dispatch rule distribution server from the event source, refers to the dispatch rule and dispatches the event to other local system which matches the dispatch destination in case the dispatch destination corresponding to the event condition is not own local system, and an event processing step which, in the local system, when receiving the event of which the dispatch destination included in the dispatch rule is own local system from the event source or other local system, processes the event according to the processing rule and notifies the application server which is a sender of the processing rule of a processing result of the event.

A rule distribution program, according to an exemplary aspect of the invention, allows a rule distribution device to function as a processing rule setting unit which, when receiving a processing rule including an event condition which indicates a condition of an event to be processed from an application server, sets the processing rule to a processing server, and a dispatch rule setting unit which generates and sends a dispatch rule including the processing server as a dispatch destination of the event which matches the event condition to a dispatch rule distribution server, and sets the generated dispatch rule or the dispatch rule received from the dispatch rule distribution server to a dispatcher.

Advantageous Effects of Invention

The effect of the present invention is, in an event processing system, to be able to suppress the load growth of setting processing of a processing rule and a dispatch rule accompanying event processing distribution.

BRIEF DESCRIPTION OF DRAWINGS

FIG. 7 A diagram showing an example of processing rule setting information 204 in the first embodiment of the present invention.

FIG. 8 A diagram showing an example of a dispatch rule 205 in the first embodiment of the present invention.

FIG. 14 A diagram showing an example of event source management information 208 in the second embodiment of the present invention.

FIG. 16 A diagram showing an example of the dispatch rule 205 in the second embodiment of the present invention.

FIG. 21 A diagram showing an example of operation of an event processing system in the third embodiment of the present invention.

FIG. 22 A diagram showing an example of event source management information 208 in a fourth embodiment of the present invention.

FIG. 28 A diagram showing an example of forwarding rule information 209 in the fifth embodiment of the present invention.

FIG. 29 A diagram showing an example of forwarding rule information 210 in the fifth embodiment of the present invention.

REFERENCE SIGNS LIST

Figure 1:
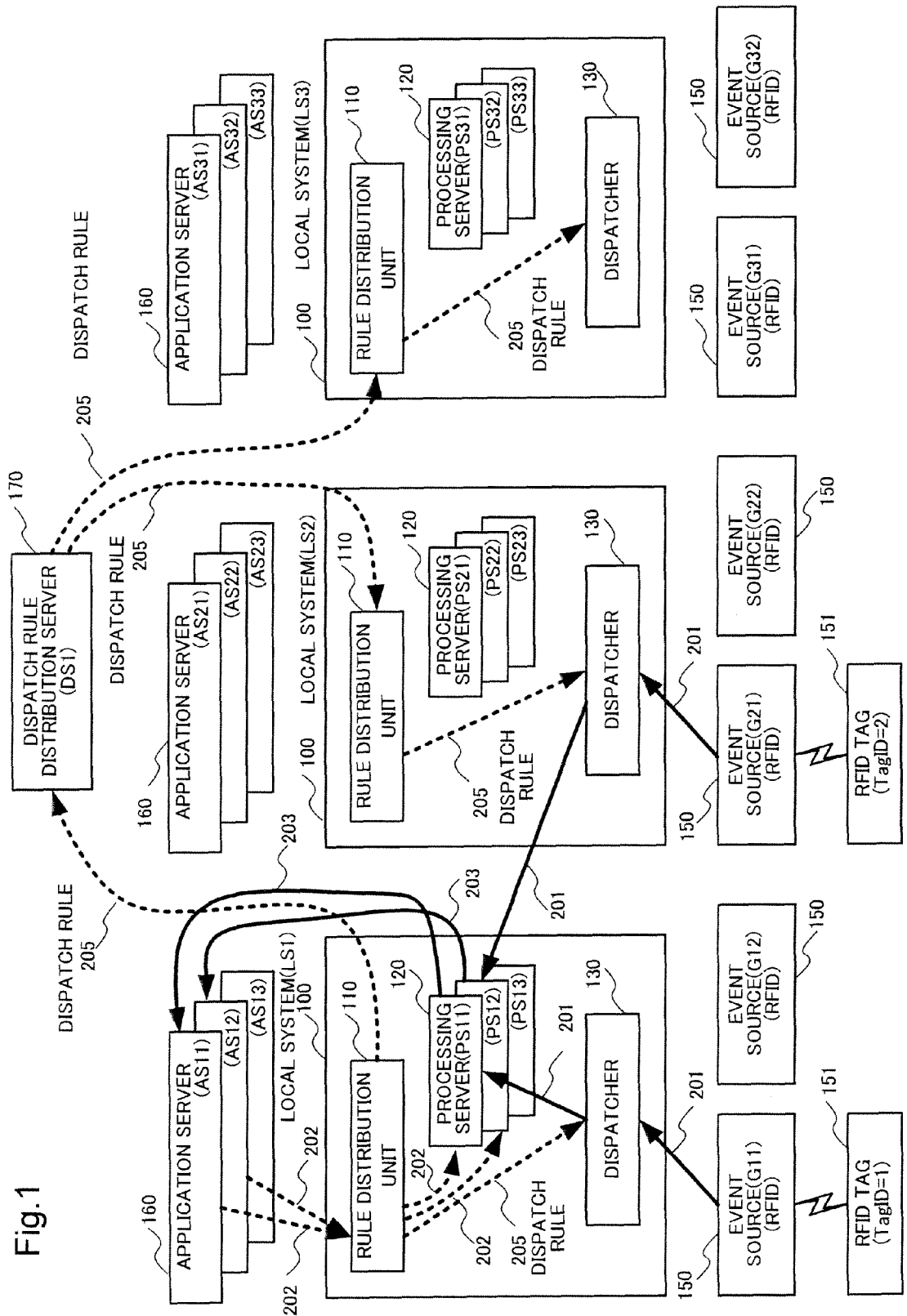
FIG. 1 A diagram showing a structure of a first embodiment of the present invention.

100 Local system
110 Rule distribution unit
111 Processing rule setting unit
112 Processing rule distribution algorithm storing unit
113 Processing rule setting information storing unit
114 Dispatch rule setting unit
115 Distribution server information storing unit
116 Event source management information storing unit
120 Processing server
130 Dispatcher
150 Event source
160 Application server
170 Dispatch rule distribution server
171 Dispatch rule forwarding unit
172 Local system management information storing unit
180 Upper level dispatch rule distribution server
201 Event
202 Processing rule
203 Event processing result
204 Processing rule setting information
205 Dispatch rule
206 Distribution server information
207 Local system management information
208 Event source management information
209 Forwarding rule information
210 Forwarding rule information
211 Upper level distribution server information
212 Lower level distribution server information

DESCRIPTION OF EMBODIMENTS

First Embodiment

Next, a first embodiment of the present invention will be described in detail with reference to drawings.

FIG. 1 is a diagram showing a structure of the first embodiment of the present invention. Referring to FIG. 1, the first embodiment of an event processing system of the present invention includes a plurality of local systems 100, a plurality of event sources 150, a plurality of application servers 160 and a dispatch rule distribution server 170 which are provided on a network (not shown).

The event source 150 sends detected information to the local system 100 as an event 201. The event source 150 may be of any form which can detect and send information to the local system 100.

For example, the event source 150 may include an information reading device of non-contact or contact type such as an RFID reader, a magnetic card reader. Also, the event source 150 may include various sensors which detect, for example, temperature, atmospheric pressure, acceleration and so on.

The event 201 which the event source 150 sends may include, in addition to "information detected by the event source 150 at a given time (for example, such as an identifier of an RFID tag, temperature, atmospheric pressure and acceleration detected at a given time)", "type of information which the event source detects (event source type)", "identifier of the event source (event source identifier)", "related information such as the detected time of the detected information" and so on as attribute information (event attribute information)".

The application server 160 is a server on which an application for various information processing to the event 201 detected in the event source 150 operates. The application server 160 performs various information processing to a result of processing performed in the local system 100 to the event 201 detected by the event source 150. Also, application server 160 sends a processing rule 202 including an event condition which designates a condition of the event 201 which local system 100 processes and processing contents which local system 100 performs to event 201 which matches the event condition to the local system 100.

Here, the processing contents of the event 201 which is performed in local system 100 may include detecting a set of a plurality of the events 201 which occur at different times, and notifying the application server 160 thereof. For example, a traceability system of an article such that the local system 100 detects whether Tag IDs of detection targets have been detected by a plurality of RFID readers in a sequence decided in advance and notifies the application server 160 of the result can be configured. Also, the processing contents of the event 201 may include statistical processing of a plurality of the events 201. For example, an environmental monitoring system such that the local system 100 performs statistical processing to temperature information detected at a plurality of spots and notifies application server 160 can be configured. Moreover, the local system 100 may perform processing based on the event 201 of different event source types such as an RFID reader and a temperature sensor and notify the application server 160 of the result.

The local system 100 generates a dispatch rule 205 based on a processing rule 202 which is received from the application server 160, and sends the dispatch rule 205 to other local system 100 via the dispatch rule distribution server 170. Also, the local system 100 dispatches the event 201 which is received from the event source 150 to other local system 100 based on the dispatch rule 205 which is received from the dispatch rule distribution server 170. Moreover, the local system 100 processes the event 201 according to the processing rule 202 and sends a processing result (an event processing result 203) of the event 201 to the application server 160.

The local system 100 further includes a rule distribution unit 110, at least one processing server 120 and at least one dispatcher 130. FIG. 1 indicates a case where local system 100 includes a plurality of processing servers 120 and one dispatcher 130.

The rule distribution unit 110 of the local system 100 performs setting of the processing rule 202 to the processing server 120, generation of the dispatch rule 205 and sending thereof to the dispatch rule distribution server 170. The processing server 120 processes the event 201 according to the processing rule 202. Upon reception of the event 201 from the event source 150, the dispatcher 130 refers to the dispatch rule 205 and dispatches it to the processing server 120 of own local system 100 or other local system 100.

Figure 2:
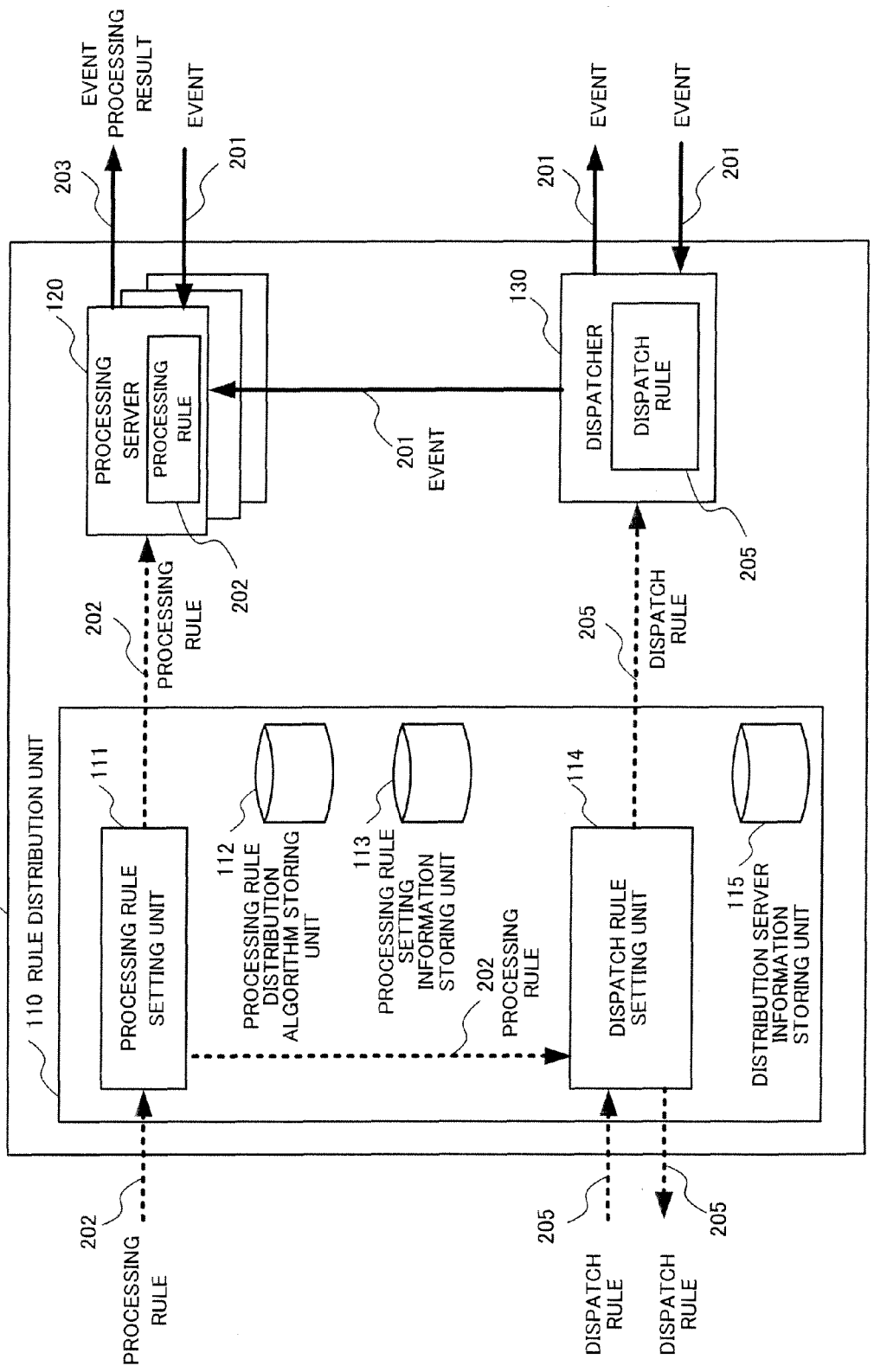
FIG. 2 A diagram showing a structure of a local system 100 in the first embodiment of the present invention.

FIG. 2. is a diagram showing a structure of the local system 100. The rule distribution unit 110 of the local system 100 further includes a processing rule setting unit 111, a processing rule distribution algorithm storing unit 112, a processing rule setting information storing unit 113, a dispatch rule setting unit 114 and a distribution server information storing unit 115.

Upon reception of the processing rule 202 from the application server 160, the processing rule setting unit 111 determines the processing server 120 which processes the processing rule 202 and sets the processing rule 202 thereto. The processing rule distribution algorithm storing unit 112 stores and manages a processing rule distribution algorithm (not shown) for determining the processing server 120 which processes the processing rule 202. The processing rule setting information storing unit 113 stores and manages a setting result of the processing rule 202 as processing rule setting information 204. The dispatch rule setting unit 114 generates the dispatch rule 205 and sets it to the dispatcher 130. The dispatch rule setting unit 114 further sends the dispatch rule 205 to the dispatch rule distribution server 170. The distribution server information storing unit 115 stores and manages distribution server information 206 including an identifier of the dispatch rule distribution server 170.

Figure 3:
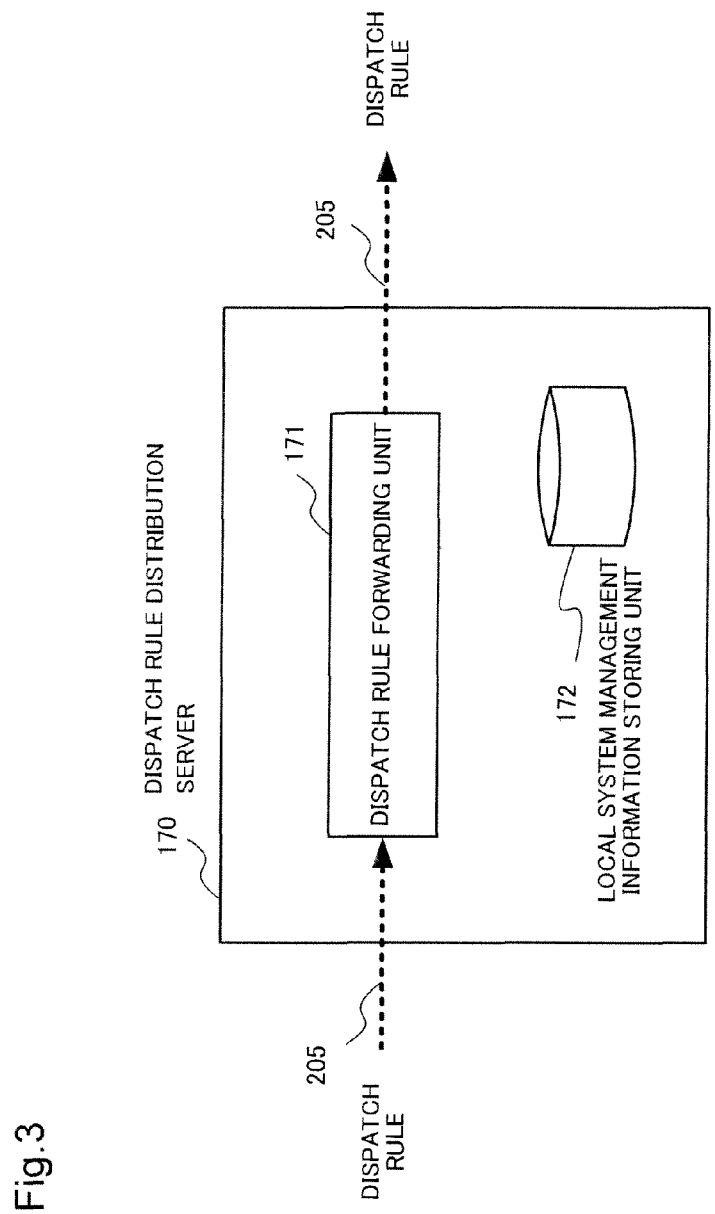
FIG. 3 A diagram showing a structure of a dispatch rule distribution server 170 in the first embodiment of the present invention.

FIG. 3 is a diagram showing a structure of the dispatch rule distribution server 170. The dispatch rule distribution server 170 includes a dispatch rule forwarding unit 171 and a local system management information storing unit 172. The dispatch rule forwarding unit 171 forwards received dispatch rule 205 to the local system 100 which is subordinate to the dispatch rule distribution server 170. The local system management information storing unit 172 stores and manages local system management information 207 including an identifier of the local system 100 which is subordinate to the dispatch rule distribution server 170.

It is to be noted that the rule distribution unit 110, the processing server 120, the dispatcher 130, the event source 150, the application server 160 and the dispatch rule distribution server 170 may be an information processing device respectively which operates by program control. Also some of them may be configured as one device. Also, the dispatch rule distribution server 170 may be installed in one of the local systems 100.

Next, operation of the first embodiment of the present invention will be described with reference to drawings.

Figure 4:
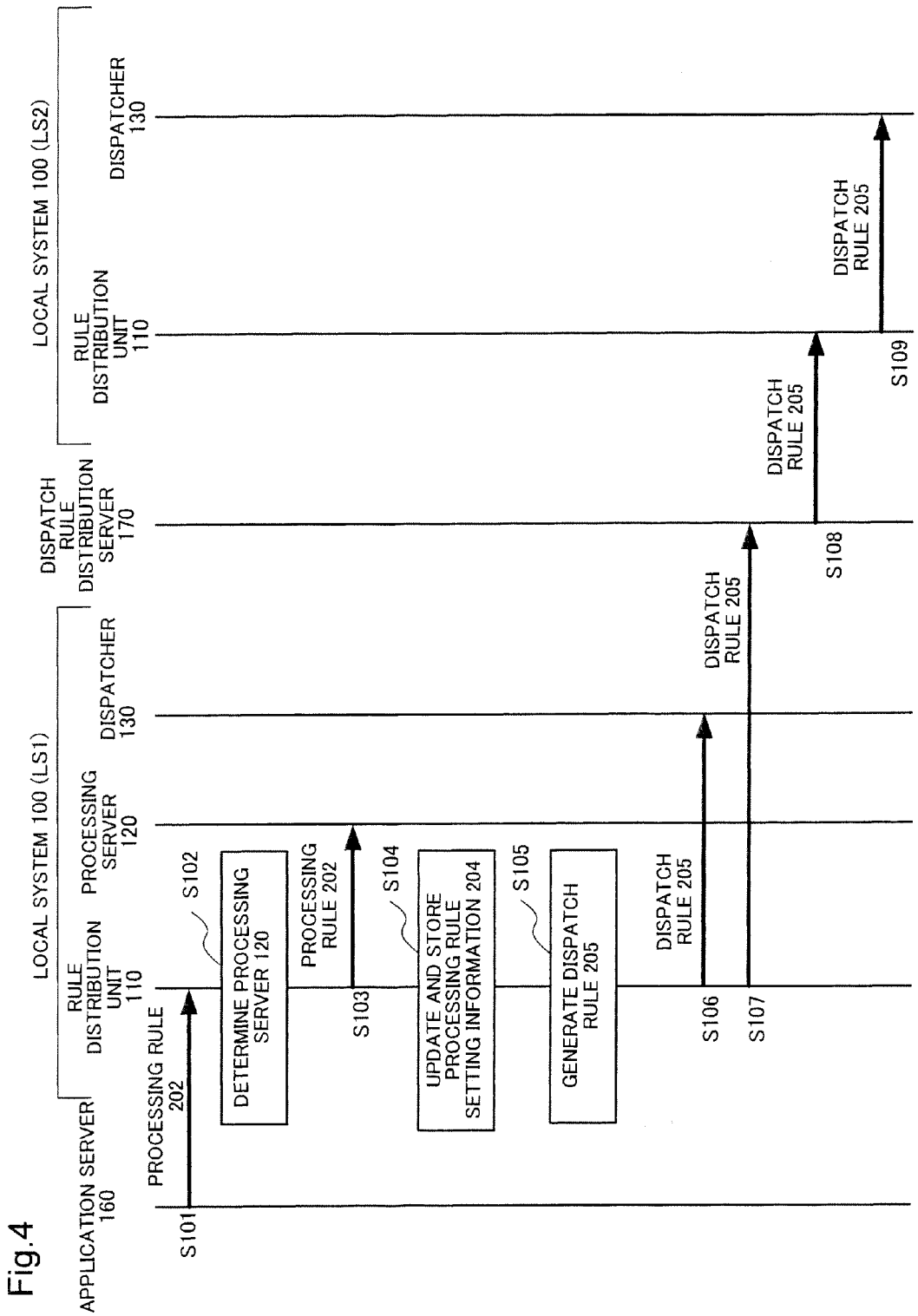
FIG. 4 A sequence diagram showing setting operation of a dispatch rule in the first embodiment of the present invention.

First, setting operation of the dispatch rule in the first embodiment of the present invention will be described. FIG. 4 is a sequence diagram showing the setting operation of the dispatch rule in the first embodiment of the present invention.

The local system 100 to which each application server 160 requests processing of the event 201 is decided in advance and is set in each application server 160. Similarly, the local system 100 to which each event source 150 sends event 201 is also decided in advance and is set in each event source 150. These settings for the local system 100 in the application server 160 or the event source 150 may be set by an administrator by designating the local system 100 directly, or each application server 160 and event source 150 may detect and set the local system 100 in the neighborhood based on a distance on the network.

The application server 160 which requests processing of the event 201 sends the processing rule 202 to the local system 100 (Step S101).

Figure 6:
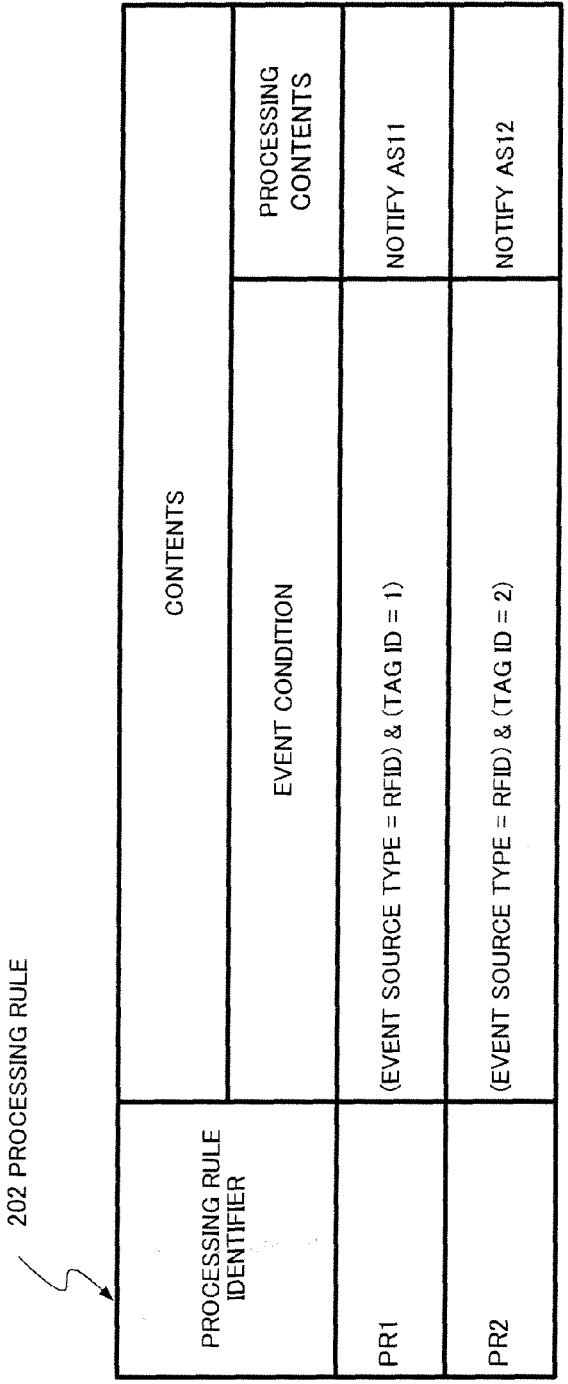
FIG. 6 A diagram showing an example of a processing rule 202 in the first embodiment of the present invention.

Here, as shown in FIG. 6, the processing rule 202 includes a processing rule identifier and processing rule contents. The processing rule contents include an event condition which designates a condition of the event 201 to be processed by the local system 100, and processing contents to be performed by the local system 100 to the event 201 which matches the event condition. In an example of FIG. 6, in the processing rule 202 (PR1), an event source type (here, RFID) and detected information (Tag ID of RFID tag=1) are designated as the event condition. As the processing contents of processing server 120 for this event condition, "notify the application server AS11" is designated.

When the local system 100 receives the processing rule 202, the processing rule setting unit 111 of the rule distribution unit 110 refers to the processing rule distribution algorithm stored in the processing rule distribution algorithm storing unit 112 and the processing rule setting information 204, and determines the processing server 120 which processes the processing rule 202 (Step S102). The local system 100 sets the processing rule 202 to the determined processing server 120 (Step S103). The processing rule setting unit 111 updates the processing rule setting information 204 and stores it in the processing rule setting information storing unit 113 (Step S104).

Note that, as a processing rule distribution algorithm, for example, there is a method which distributes the processing rule 202 according to the processing contents in such a way that a load of processing server 120 is balanced equally, or a method, as disclosed in Japanese Patent Publication No. 4161998, which distributes the processing rule 202 of which the event condition is identical to identical processing server 120.

As shown in FIG. 7, the processing rule setting information 204 includes a processing server identifier and an identifier of the processing rule 202 which is set. In an example of FIG. 7, the processing rules 202 (PR1, PR3, PR6) are set to the processing server 120 (PS11).

The dispatch rule setting unit 114 generates the dispatch rule 205 including the processing server 120 to which the processing rule 202 is set as a dispatch destination of the event 201 which matches the event condition of the processing rule 202 (Step S105).

As shown in FIG. 8, the dispatch rule 205 includes a dispatch rule identifier and dispatch rule contents. The dispatch rule contents include an event condition and an identifier of the processing server 120 which is the dispatch destination. In an example of FIG. 8, as the dispatch rule 205 (DR1), the event condition (event source type: RFID, detected information: Tag ID=1) of the processing rule 202 (PR1) is set as the event condition and the identifier (LS1/PS1) of the processing server 120 which processes the processing rule 202 (PR1) is set as the dispatch destination.

The dispatch rule setting unit 114 sets the generated dispatch rule 205 to the dispatcher 130 (Step S106). Also, the dispatch rule setting unit 114 refers to the distribution server information 206 of the distribution server information storing unit 115 and sends the generated dispatch rule 205 to the dispatch rule distribution server 170 (Step S107). At that time, the dispatch rule setting unit 114 sends an identifier of own local system 100 with the dispatch rule 205.

Figure 9:
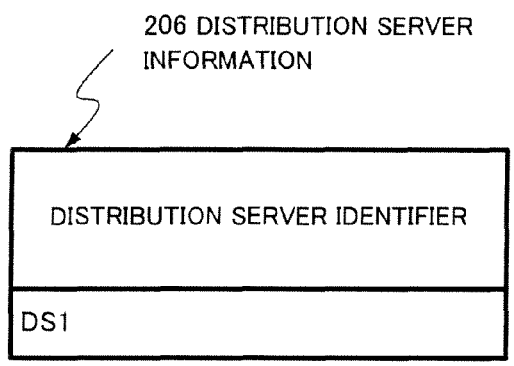
FIG. 9 A diagram showing an example of distribution server information 206 in the first embodiment of the present invention.

As shown in FIG. 9, the distribution server information 206 includes an identifier (distribution server identifier) of the dispatch rule distribution server 170. In an example of FIG. 9, as the distribution server identifier, DS1 is set. The distribution server information 206 is set to each local system 100 in advance.

When the dispatch rule distribution server 170 receives the dispatch rule 205, the dispatch rule forwarding unit 171 refers to the local system management information 207 of the local system management information storing unit 172 and forwards the received dispatch rule 205 to the local system 100 which is subordinate to the dispatch rule distribution server 170 (Step S108). Note that the dispatch rule forwarding unit 171 may not forward the dispatch rule 205 to the local system 100 which is a sender of the dispatch rule 205.

Figure 10:
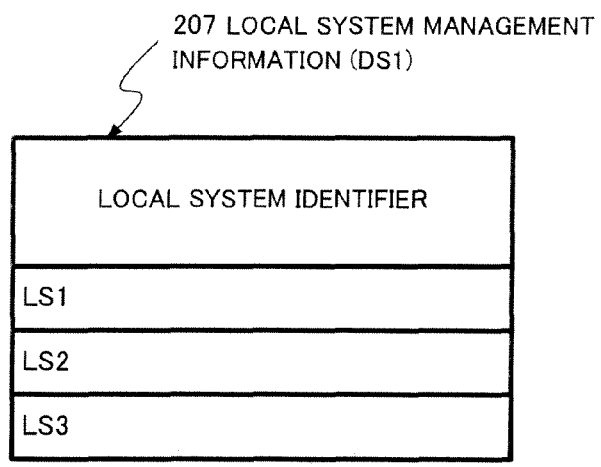
FIG. 10 A diagram showing an example of local system management information 207 in the first embodiment of the present invention.

As shown in FIG. 10, the local system management information 207 includes an identifier of the local system 100 which is subordinate to the dispatch rule distribution server 170 (forwarding target of the dispatch rule 205). The contents of the local system management information 207 may be set by an administrator and so on in advance, or may be set based on a notification of the local system identifier to the dispatch rule distribution server 170 from each local system 100.

In an example of FIG. 10, as the identifier of local system 100, LS1, LS2 and LS3 are set. In this case, when the dispatch rule distribution server 170 receives the dispatch rule 205 from the local system 100 (LS1), the dispatch rule forwarding unit 171 forwards the received dispatch rule 205 to the local systems 100 (LS2, LS3).

When the local system 100 receives the dispatch rule 205, the dispatch rule setting unit 114 sets the dispatch rule 205 to the dispatcher 130 (Step S109).

Figure 5:
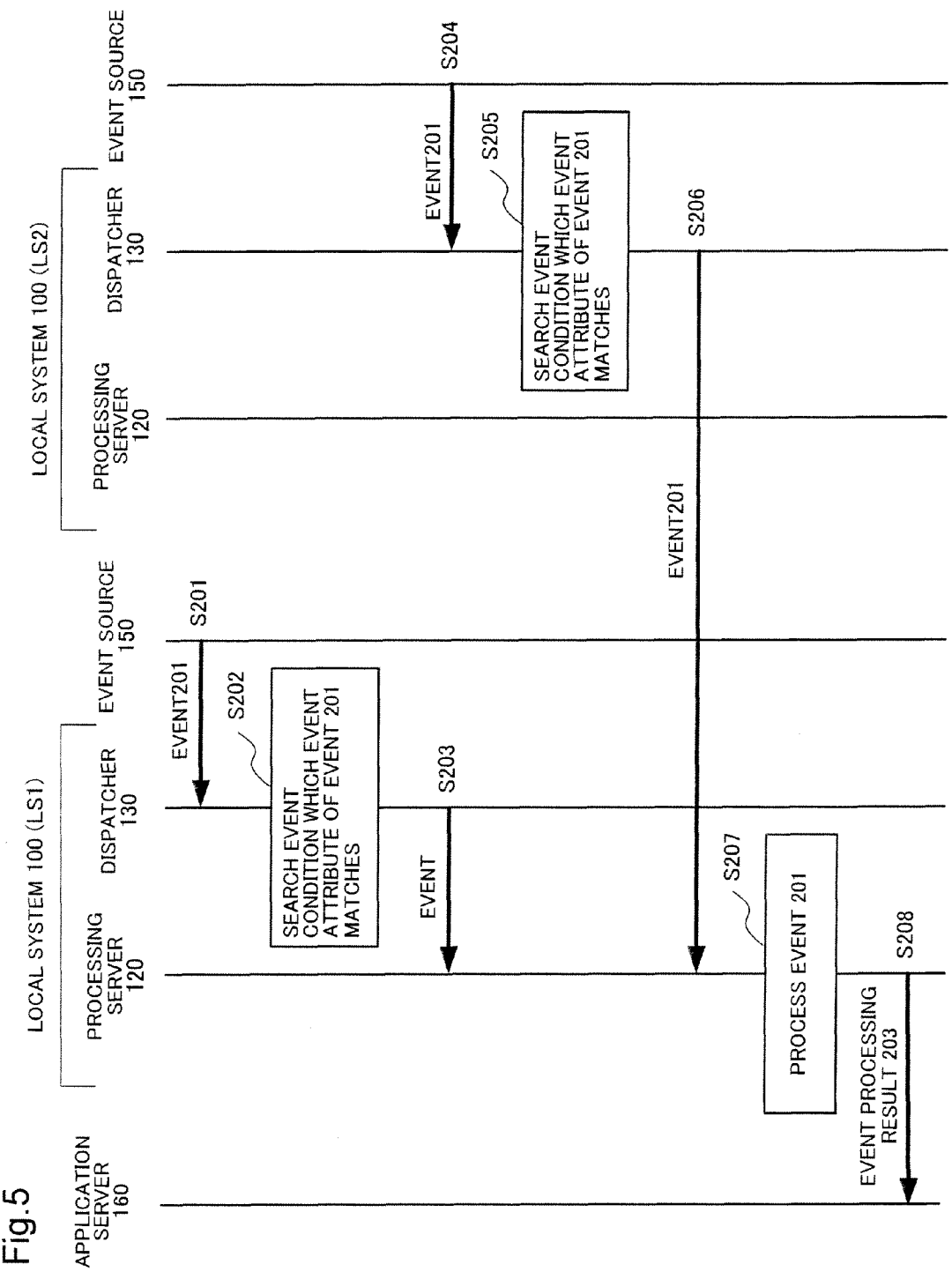
FIG. 5 A sequence diagram showing event processing operation in the first embodiment of the present invention.

Next, event processing operation in the first embodiment of the present invention will be described. FIG. 5 is a sequence diagram showing the event processing operation in the first embodiment of the present invention.

When the event source 150 detects information of a detection target, the event source 150 sends the detected information to the local system 100 as the event 201 (Steps S201, S204).

Figure 11:
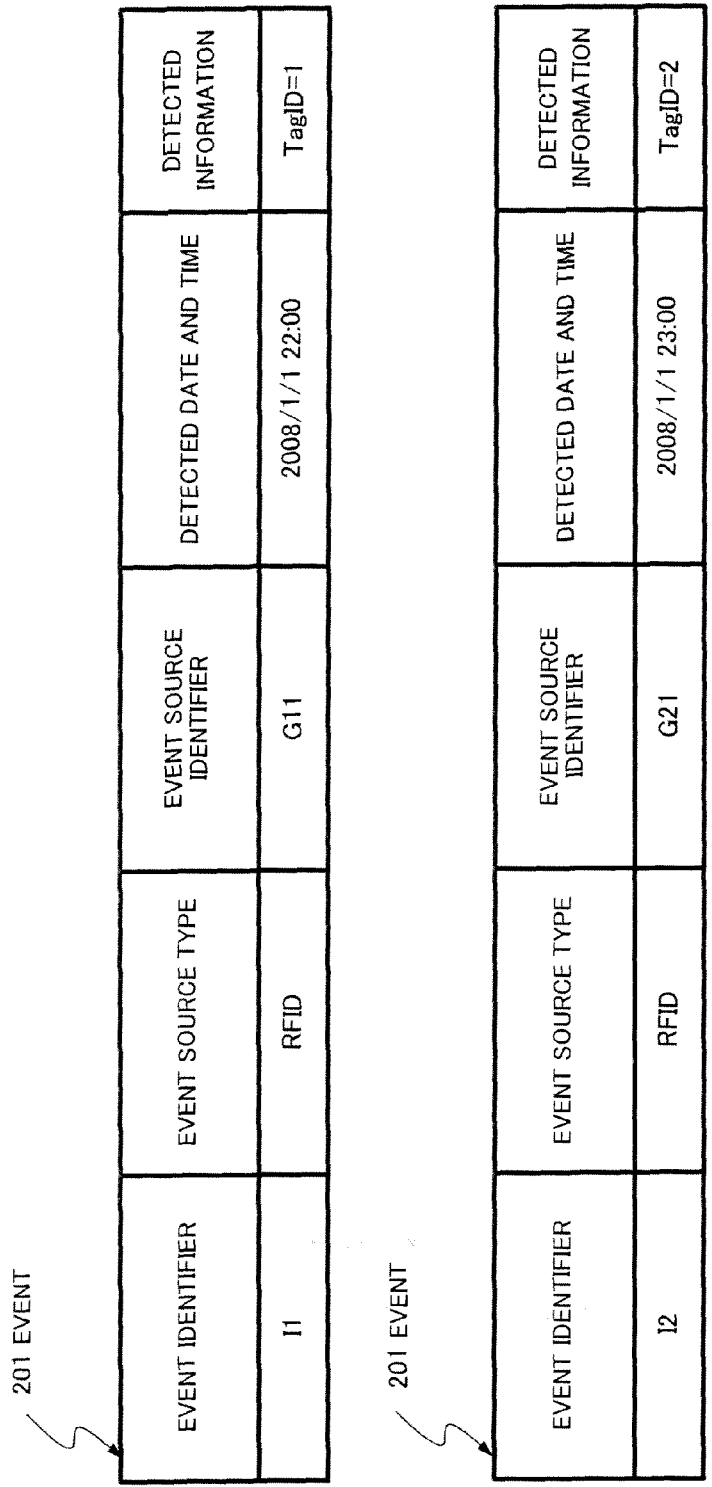
FIG. 11 A diagram showing an example of an event 201 in the first embodiment of the present invention.

As shown in FIG. 11, the event 201 may include event attribute information such as an event identifier, an event source type, an event source identifier, detected time and detected information. In an example of FIG. 11, as the event attribute information of the event 201 (11), the event source type: RFID, the event source identifier: G11 and the detected information: Tag ID=1 are set.

When the local system 100 receives the event 201, the dispatcher 130 searches the event conditions of the dispatch rule 205 which the event attribute information included in the event 201 matches (Steps S202, S205). When there exists the event condition which the event attribute information matches, the dispatcher 130 refers to the dispatch rule 205 and dispatches the event 201 to the processing server 120 corresponding to the event condition (Steps S203, S206). Here, the event 201 is dispatched to the processing server 120 of own local system 100 if the processing server 120 is in own local system 100, and dispatched to the processing server 120 of the other local system 100 if the processing server is in the other local system 100.

For example, in case the local system 100 (LS1) receives the event 201 (11), because the event attribute information (event source type: RFID, event source identifier: G11, detected information: Tag ID=1) of the event 201 (11) matches the event condition of the dispatch rule 205 (DR1), the dispatcher 130 of the local system 100 (LS1) dispatches the event 201 (11) to the processing server 120 (PS11) of own local system 100 (LS1). In case the local system 100 (LS2) receives the event 201 (12), because the event attribute information (event source type: RFID, event source identifier: G21, detected information: Tag ID=2) of the event 201 (12) matches the event condition of the dispatch rule 205 (DR2), the dispatcher 130 of the local system 100 (LS2) dispatches the event 201 (12) to the processing server 120 (PS12) of other local system 100 (LS1).

When the processing server 120 of the local system 100 receives the event 201, the processing server 120 processes the event 201 according to the processing rule 202 (Step S207) and sends the event processing result 203 to the application server 160 (Step S208).

For example, in case the processing server 120 (PS11) of the local system 100 (LS1) processes the event 201 (11), the processing server 120 (PS11) sends the event processing result 203 to the application server 160 (AS11). In case the processing server 120 (PS12) of the local system 100 (LS1) processes the event 201 (12), the processing server 120 (PS12) sends the event processing result 203 to the application server 160 (AS12).

As shown in FIG. 1, the event 201 (11, 12) (Tag ID=1, 2) sent from the event source 150 which is subordinate to the local system 100 are sent to the local system 100 (LS1), and the event processing result 203 is sent to the application server 160 (AS11, AS12).

This completes the operation of the first embodiment of the present invention.

Figure 12:
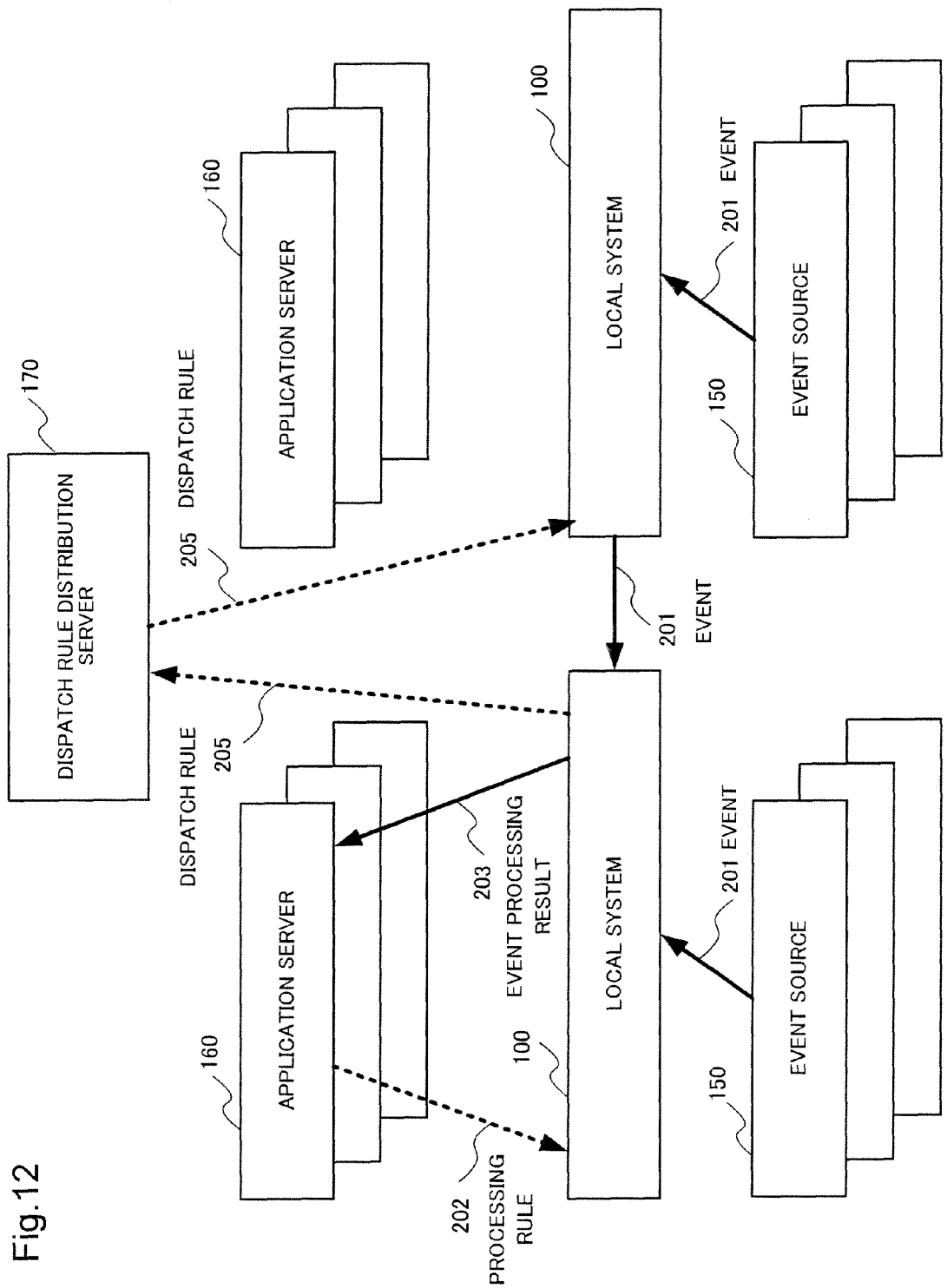
FIG. 12 A diagram showing a characteristic structure of the first embodiment of the present invention.

Next, a characteristic structure of the first embodiment is shown in FIG. 12.

An event processing system includes a plurality of local systems 100 which receive an event 201 from an event source 150 and send a processing result of the event 201 to an application server 160, and a dispatch rule distribution server 170 which distributes a dispatch rule 205 to the local systems 100.

Here, each of the plurality of local systems 100, when receiving a processing rule 202 including an event condition which indicates a condition of the event 201 to be processed from the application server 160, generates the dispatch rule 205 including own local system 100 as a dispatch destination of the event 201 which matches the event condition and sends the dispatch rule 205 to the dispatch rule distribution server 170, when receiving the event 201 which matches the event condition included in the dispatch rule 205 received from the dispatch rule distribution server 170 from the event source 150, refers to the dispatch rule 205 and dispatches the event 201 to other local system 100 which matches the dispatch destination in case the dispatch destination corresponding to the event condition is not own local system 100, and when receiving the event 201 of which the dispatch destination included in the dispatch rule 205 is own local system from the event source 150 or other local system 100, processes the event 201 according to the processing rule 202 and notifies the application server 160 which is a sender of the processing rule 202 of a processing result (event processing result 203) of the event 201.

The dispatch rule distribution server 170, when receiving the dispatch rule 205 from one of the plurality of local systems 100, forwards the dispatch rule 205 to other local system 100 being subordinate.

According to the first embodiment of the present invention, a load of setting of the processing rule or the dispatch rule in the event processing distribution can be suppressed. The reason is because the plurality of local systems 100 are provided in the event processing system, and each of the local system 100 receives the processing rule 202 from the application server 160, generates the dispatch rule 205 including own local system 100 as a dispatch destination of the event 201 and forwards it to other local system 100 via the dispatch rule distribution server 170.

Second Embodiment

Next, a second embodiment of the present invention will be described in detail with reference to drawings.

In the first embodiment of the present invention, it is assumed that the event source 150 which generates the event 201 to be processed by the processing server 120 (which matches an event condition) cannot be determined. This corresponds to a case, for example, a value of information (tag ID of RFID or detected value of a sensor, for example) detected by the event source 150 (RFID reader or, a sensor, for example) is designated as the event condition, and the event source 150 which sends the detected value cannot be determined.

In contrast, in the second embodiment of the present invention, a case that each local system 100 can determine whether it can receive the event 201 which matches the event condition from the event source 150 which sends the event 201 to own local system 100 is described. This corresponds to, for example, a case in which an event source identifier (identifier of RFID reader or a sensor) is designated as the event condition, and further, each local system 100 knows the event source identifier which sends the event 201 to own local system 100.

In the second embodiment of the present invention, it differs from the first embodiment of the present invention in a point that the dispatch rule setting unit 114 of the rule distribution unit 110 does not set the dispatch rule 205 to the dispatcher 130 unconditionally, but sets the dispatch rule 205 to the dispatcher 130 in case there is a possibility to receive the event 201 which matches the event condition included in the dispatch rule 205 from the event source 150.

Note that, in the second embodiment of the present invention, a component having the same reference number as the first embodiment is similar to the first embodiment unless otherwise described.

Figure 13:
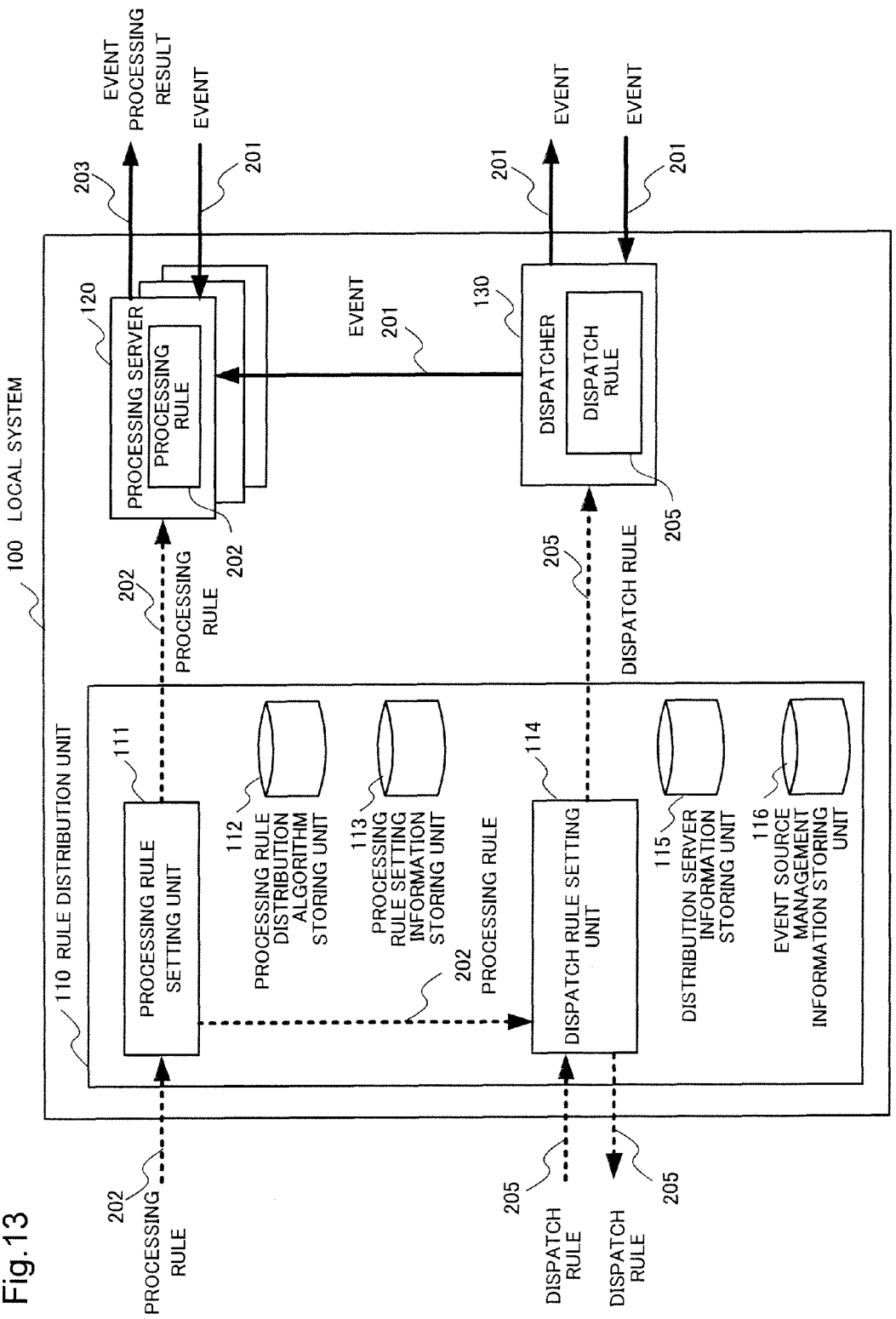
FIG. 13 A diagram showing a structure of the local system 100 in a second embodiment of the present invention.

FIG. 13 is a diagram showing a structure of the local system 100 in the second embodiment of the present invention. Referring to FIG. 13, the rule distribution unit 110 of the local system 100 further includes event source management information storing unit 116 which stores and manages event source management information 208.

Here, as shown in FIG. 14, the event source management information 208 includes a value of an event attribute (attribute value) which has a possibility to be received from the event source 150. In an example of FIG. 14, concerning the event source type and the event source identifier among the event attribute information, values which have a possibility to be received from the event source 150, that is, the event source type and the event source identifier of the event source 150 which are connected to own local system 100 are set. For example, as the event source type and the event source identifier, (RFID, G11), (RFID, G12) and (temperature, G13) are set to the event source management information 208 of the local system 100 (LS1).

The contents of the event source management information 208 may be set by an administrator and so on in advance or may be set based on a notification to the local system 100 from the event source 150. For example, the event source 150 may notify the local system 100 of the event source type and the event source identifier when it determines the local system 100 which is a sending destination of the event 201, and the local system 100 may update the event source management information 208 based on the notified information.

The dispatch rule setting unit 114 refers to the event source management information 208, and in case there is a possibility that own local system 100 receives the event attribute information which matches the event condition from the event source 150, sets the dispatch rule 205 to the dispatcher 130.

Next, operation of the second embodiment of the present invention will be described.

In Step S106 of FIG. 4, the dispatch rule setting unit 114 refers to the event source management information 208 of the event source management information storing unit 116, and in case there is a possibility that own local system 100 receives the event attribute information which matches the event condition included in the generated dispatch rule 205 from the event source 150, sets the dispatch rule 205 to the dispatcher 130. Otherwise, the dispatch rule setting unit 114 does not set the dispatch rule 205 to the dispatcher 130.

Figure 15:
FIG. 15 A diagram showing an example of the processing rule 202 in the second embodiment of the present invention.
Figure 17:
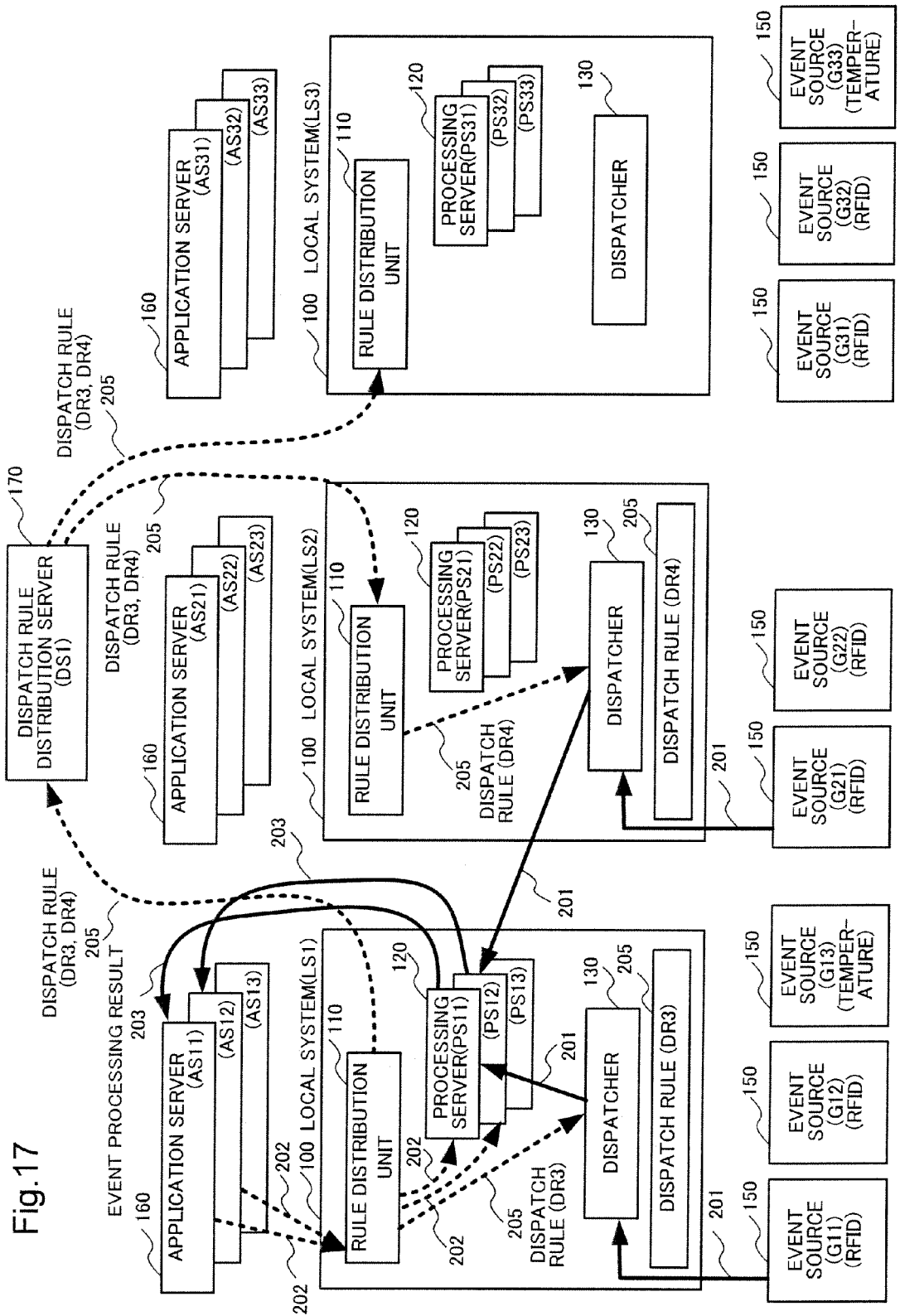
FIG. 17 A diagram showing an example of operation of an event processing system in the second embodiment of the present invention.

For example, in the local system 100 (LS1), in case the event source management information 208 (LS1) of FIG. 14 is set and the dispatch rule 205 (DR3) of FIG. 16 is generated for the processing rule 202 (PR3) of FIG. 15, the event condition of the dispatch rule 205 (event source type: RFID, event source identifier: G11) matches (RFID, G11) of the event source management information 208 (LS1). Accordingly, as shown in FIG. 17, the dispatch rule setting unit 114 sets the dispatch rule 205 (DR3) to the dispatcher 130. On the other hand, in case the dispatch rule 205 (DR4) is generated for the processing rule 202 (PR4), the event condition (event source type: RFID, event source identifier: G21) does not match the event source management information 208 (LS1). Accordingly, the dispatch rule setting unit 114 does not set the dispatch rule 205 (DR4) to the dispatcher 130.

Similarly, in Step S109 of FIG. 4, the dispatch rule setting unit 114 refers to the event source management information 208 of the event source management information storing unit 116, and in case there is a possibility that own local system 100 receives the event attribute information which matches the event condition included in the received dispatch rule 205 from the event source 150, sets the dispatch rule 205 to the dispatcher 130. Otherwise, the dispatch rule setting unit 114 does not set the dispatch rule 205 to the dispatcher 130.

For example, in the local system 100 (LS2), in case the event source management information 208 (LS2) of FIG. 14 is set and the dispatch rule 205 (DR4) of FIG. 16 is received, the event condition (event source type: RFID, event source identifier: G21) matches (RFID, G21) of the event source management information 208 (LS2). Accordingly, as shown in FIG. 17, the dispatch rule setting unit 114 sets the dispatch rule 205 (DR4) to the dispatcher 130. On the other hand, in case the dispatch rule 205 (DR3) is received, the event condition (event source type: RFID, event source identifier: G11) does not match the event source management information 208 (LS2). Accordingly, the dispatch rule setting unit 114 does not set the dispatch rule 205 (DR3) to the dispatcher 130.

As a result, as shown in FIG. 17, the event 201 (event information source identifier=G11) which is sent from the event source 150 (G11) which is subordinate to the local system 100 (LS1) is dispatched to the local system 100 (LS1), and the event processing result 203 is sent to the application server 160 (AS11). Also, the event 201 (event information source identifier=G21) which is sent from the event source 150 (G21) which is subordinate to the local system 100 (LS2) is dispatched to the local system 100 (LS1), and the event processing result 203 is sent to the application server 160 (AS12).

This completes the operation of the second embodiment of the present invention.

According to the second embodiment of the present invention, in the event processing system, a load of setting of the dispatch rule in the dispatcher can be suppressed. The reason is because the local system 100 sets the dispatch rule 205 to the dispatcher 130 in case there is a possibility to receive the event attribute information which matches the event condition included in the dispatch rule 205 from the event source 150. Therefore, unnecessary dispatch rule 205 is not set to the dispatcher 130.

Third Embodiment

Next, a third embodiment of the present invention will be described in detail with reference to drawings.

In the third embodiment of the present invention, a case that the dispatch rule distribution server 170 can determine whether each local system 100 can receive the event 201 which matches the event condition from the event source 150 is described.

In the third embodiment of the present invention, it differs from the first embodiment of the present invention in a point that the dispatch rule forwarding unit 171 of the dispatch rule distribution server 170 does not forward the dispatch rule 205 to the local system 100 unconditionally, but forwards the dispatch rule 205 to the local system 100 in case there is a possibility that the local system 100 receive the event 201 which matches the event condition included in the dispatch rule 205 from the event source 150.

Note that, in the third embodiment of the present invention, a component having the same reference number as the first embodiment is similar to the first embodiment unless otherwise described.

Figure 18:
FIG. 18 A diagram showing an example of local system management information 207 in a third embodiment of the present invention.

FIG. 18 is a diagram showing the local system management information 207 of the dispatch rule distribution server 170 in the third embodiment of the present invention. The local system management information 207 includes, in addition to the identifier of the local system 100 which is subordinate to the dispatch rule distribution server 170, the attribute value which has a possibility that each local system 100 receives from the event source 150. The contents of the local system management information 207 may be set by an administrator and so on in advance, or may be set based on a notification of the event information source type and the event information source identifier of the subordinate event information source 205 to the dispatch rule distribution server 170 from each local system 100.

In an example of FIG. 18, for each local system 100, concerning the event source type and the event source type identifier among the event attribute information, values which has a possibility to be received from the event source 150, that is, the event source type and the event source identifier of the event source 150 which are connected to each local system 100 are set. For example, for local system 100 (LS3), as the event source type and the event source identifier, (RFID, G31), (RFID, G32) and (temperature, G33) are set.

The dispatch rule forwarding unit 171 refers to the local system management information 207 and, in case there is a possibility that the local system 100 receives the event 201 which matches the event condition included in the dispatch rule 205 from the event source 150, forwards the dispatch rule 205 to the local system 100.

Next, operation of the third embodiment of the present invention will be described.

In Step S108 of FIG. 4, the dispatch rule forwarding unit 171 refers to the local system management information 207 of the local system management information storing unit 172 and, in case there is a possibility that the local system 100 receives the event 201 which matches the event condition included in the dispatch rule 205 from the event source 150, forwards the dispatch rule 205 to the local system 100. Otherwise, it does not forward the dispatch rule 205 to the local system 100.

Note that, same as the first embodiment, the dispatch rule distribution server 170 may not forward the dispatch rule 205 to the local system 100 which is a sender of the dispatch rule 205.

Figure 19:
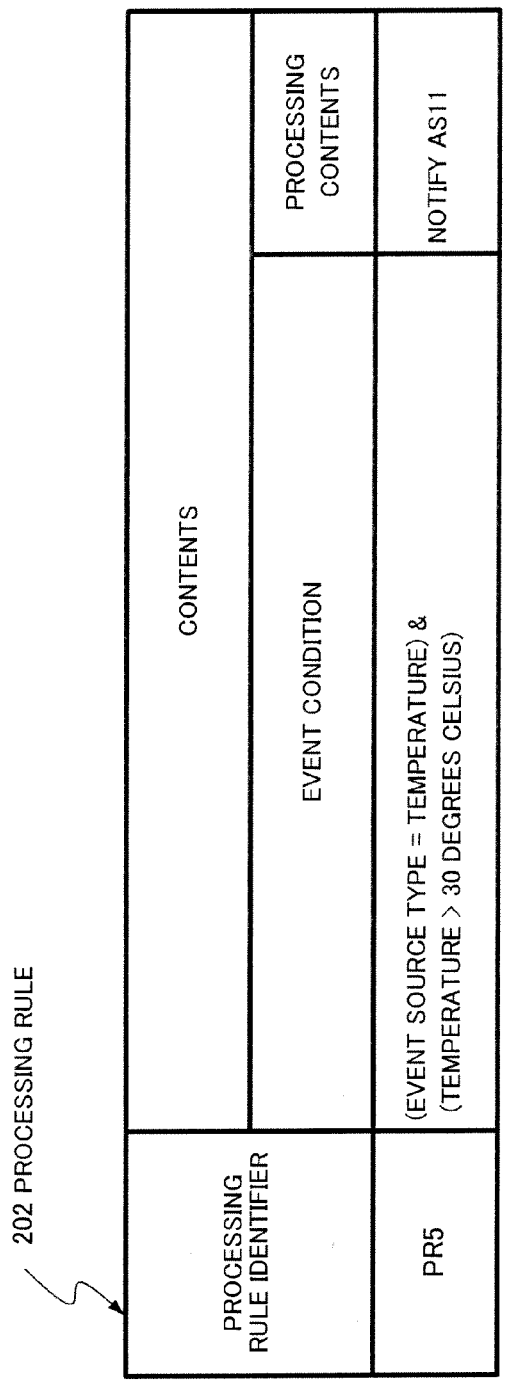
FIG. 19 A diagram showing an example of the processing rule 202 in the third embodiment of the present invention.
Figure 20:
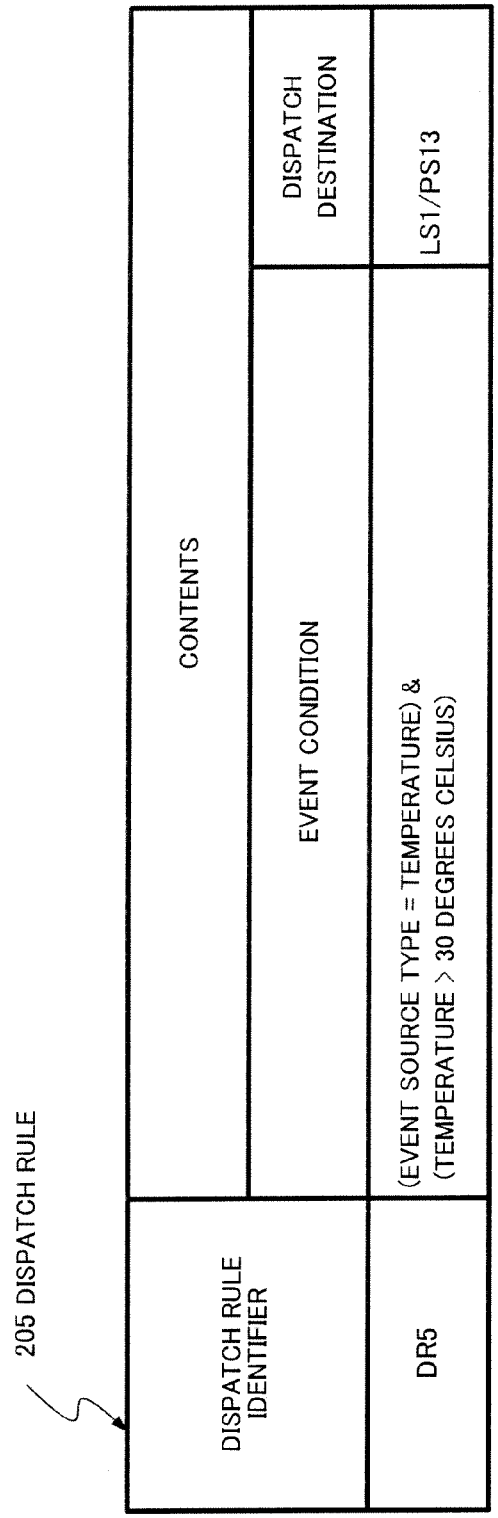
FIG. 20 A diagram showing an example of the dispatch rule 205 in the third embodiment of the present invention.

For example, in the local system 100 (LS1), in case the processing rule 202 (PR5) of FIG. 19 is set, the dispatch rule 205 (DR5) of FIG. 20 is generated and sent to the dispatch rule distribution server 170 (DS1). Here, in case the local system management information 207 of FIG. 18 is set to the dispatch rule distribution server 170 (DS1), the event condition (event source type: temperature) matches the event source type of LS1 and LS3 of the local system management information 207. Accordingly, as shown in FIG. 17, the dispatch rule forwarding unit 171 forwards the dispatch rule 205 (DR5) to the local system 100 (LS3). On the other hand, the dispatch rule forwarding unit 171 does not forward the dispatch rule 205 (DR5) to the local system 100 (LS2).

As a result, as shown in FIG. 21, the event 201 (event source type: temperature) sent from the event source 150 which is subordinate to the local system 100 (LS1, LS3) is dispatched to the local system 100 (LS1), and the event processing result 203 is sent to the application server 160 (AS11).

This completes the operation of the third embodiment of the present invention.

According to the third embodiment of the present invention, in the event processing system, a load of setting of a dispatch rule in the rule distribution unit of the local system can be suppressed. The reason is because the dispatch rule distribution server 170 forwards the dispatch rule 205 to the local system 100 in case there is a possibility that the local system 100 receives the event 201 which matches the event condition included in the dispatch rule 205 from the event source 150. Therefore, unnecessary dispatch rule 205 is not distributed to the local system 100.

Fourth Embodiment

Next, a fourth embodiment of the present invention will be described in detail with reference to drawings.

In the fourth embodiment of the present invention, a case that regularity is given to an assignment method of an event source identifier and a plurality of the event sources 150 which are detection target of the event 201 are designated collectively by designating a part of the event source identifier is described.

In the fourth embodiment of the present invention, it differs from the second embodiment of the present invention in a point that the dispatch rule setting unit 114 of the local system 100 forwards the dispatch rule 205 to the dispatch rule distribution server 170 in case there is a possibility that other local system 100 receives the event 201 with the event source identifier included in the event condition from the event source 150.

Note that, in the fourth embodiment of the present invention, a component having the same reference number as the second embodiment is similar to the second embodiment unless otherwise described.

FIG. 22 is a diagram showing an example of the event source management information 208 of each local system 100 in the fourth embodiment of the present invention.

As an assignment rule of the event source identifier, the event source identifier includes a value of the identifier of the local system 100 that is a sending destination to which the event source sends the event 201. For example, as shown in FIG. 22, a value like G1.* (* indicates an arbitrary value) is set to the event source identifier of the local system 100 (LS1) and a value like G2.* is set to the event source identifier of the local system 100 (LS2).

Also, in each local system 100, a predetermined value is assigned to a part of the event source identifier for specific event source 150. For example, G*.0 is assigned to the event source 150 which detects specific event 201 which is subordinate to the local system 100.

The dispatch rule setting unit 114 of the local system 100 forwards the dispatch rule 205 to the dispatch rule distribution server 170 in case there is a possibility that other local system 100 receives the event 201 with the event source identifier included in the event condition from the event source 150.

Next, operation of the fourth embodiment of the present invention will be described with reference to drawings.

In Step S106 of FIG. 4, the dispatch rule setting unit 114 forwards the dispatch rule 205 to the dispatch rule distribution server 170 in case there is a possibility that other local system 100 receives the event 201 with the event source identifier included in the event condition from the event source 150.

Figure 23:
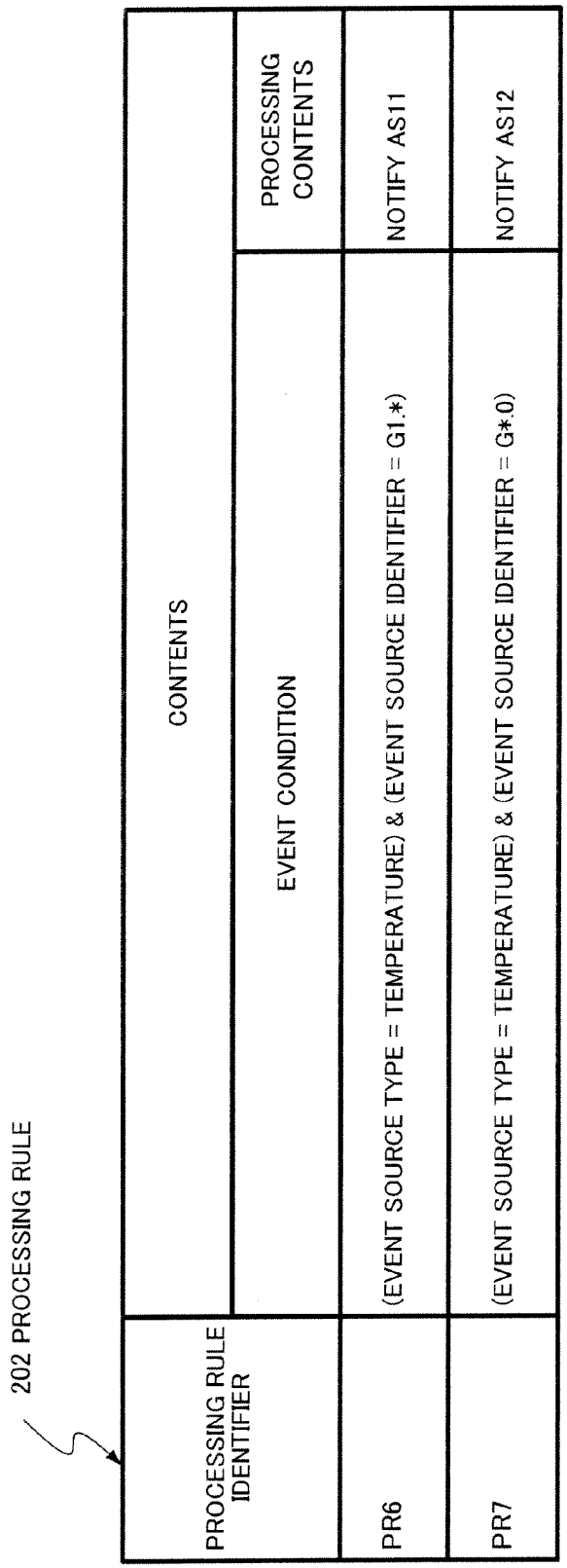
FIG. 23 A diagram showing an example of the processing rule 202 in the fourth embodiment of the present invention.
Figure 24:
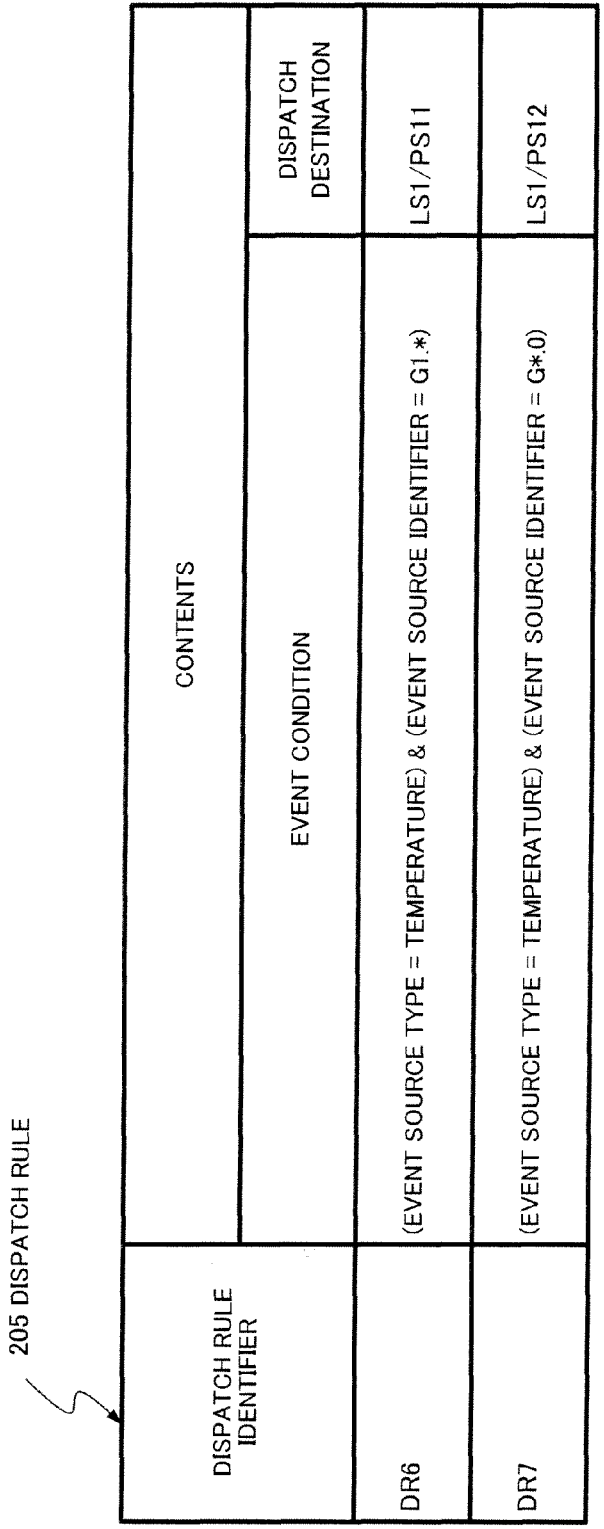
FIG. 24 A diagram showing an example of dispatch rule 205 in the fourth embodiment of the present invention.

For example, in the local system 100, in case that the event source management information 208 of FIG. 22 is set and the dispatch rule 205 (DR6) of FIG. 24 is generated for the processing rule 202 (PR6) of FIG. 23, the event source identifier=G1.* in the event condition is the event source 150 which sends the event 201 to own local system 100 (LS1). Other local system 100 does not receive the event 201 from the event source 150 whose event source identifier=G1.*. Accordingly, as shown in FIG. 25, the dispatch rule setting unit 114 sets the dispatch rule 205 (DR6) to the dispatcher 130 of own local system 100 (LS1), but does not forward it to the dispatch rule distribution server 170.

Figure 25:
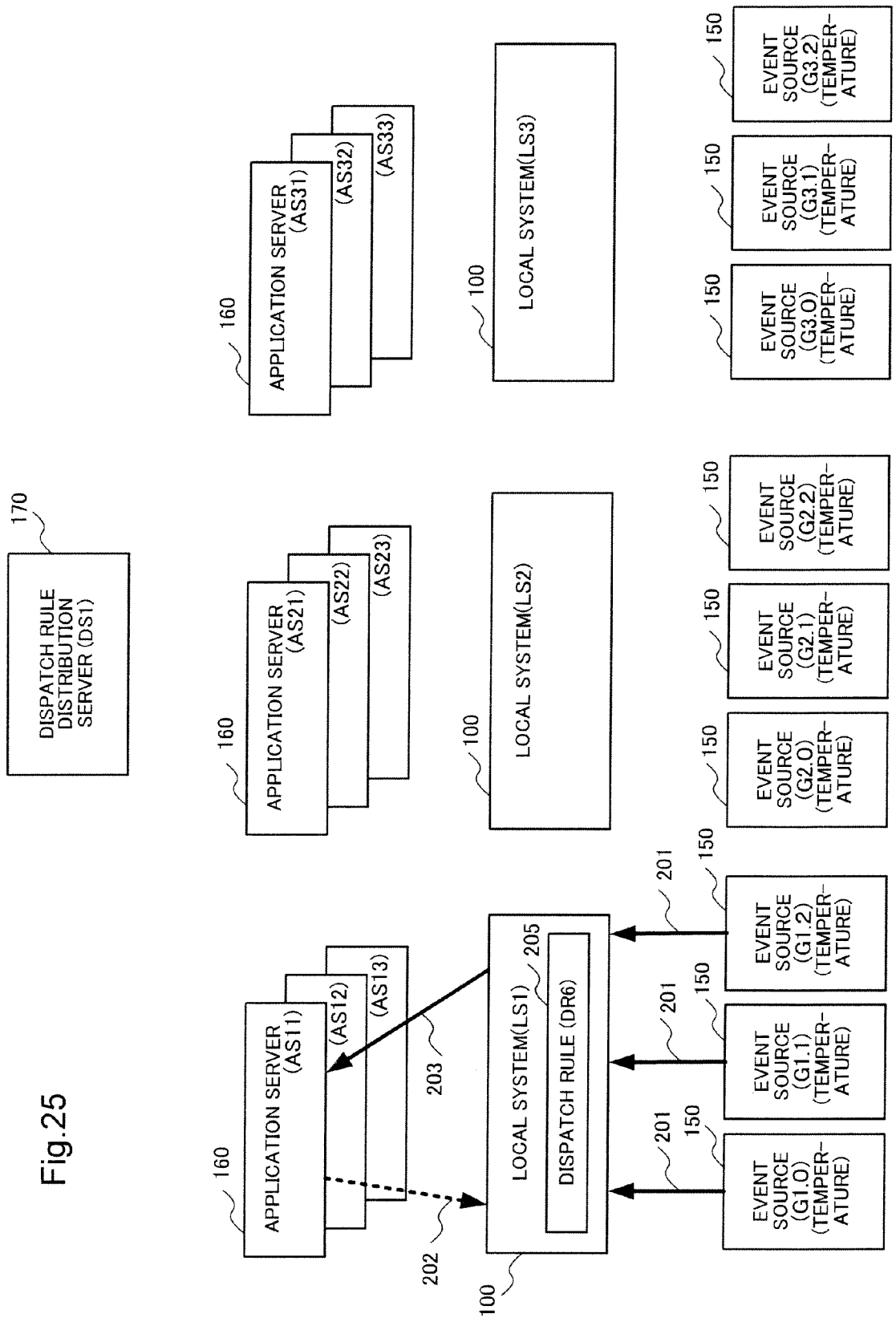
FIG. 25 A diagram showing an example of operation of an event processing system in the fourth embodiment of the present invention.

As a result, as shown in FIG. 25, the event 201 (event source identifier=G1.*) sent from all event sources 150 which are subordinate to the local system 100 (LS1) is dispatched to the local system 100 (LS1), and the event processing result 203 is sent to the application server 160 (AS11).

Figure 26:
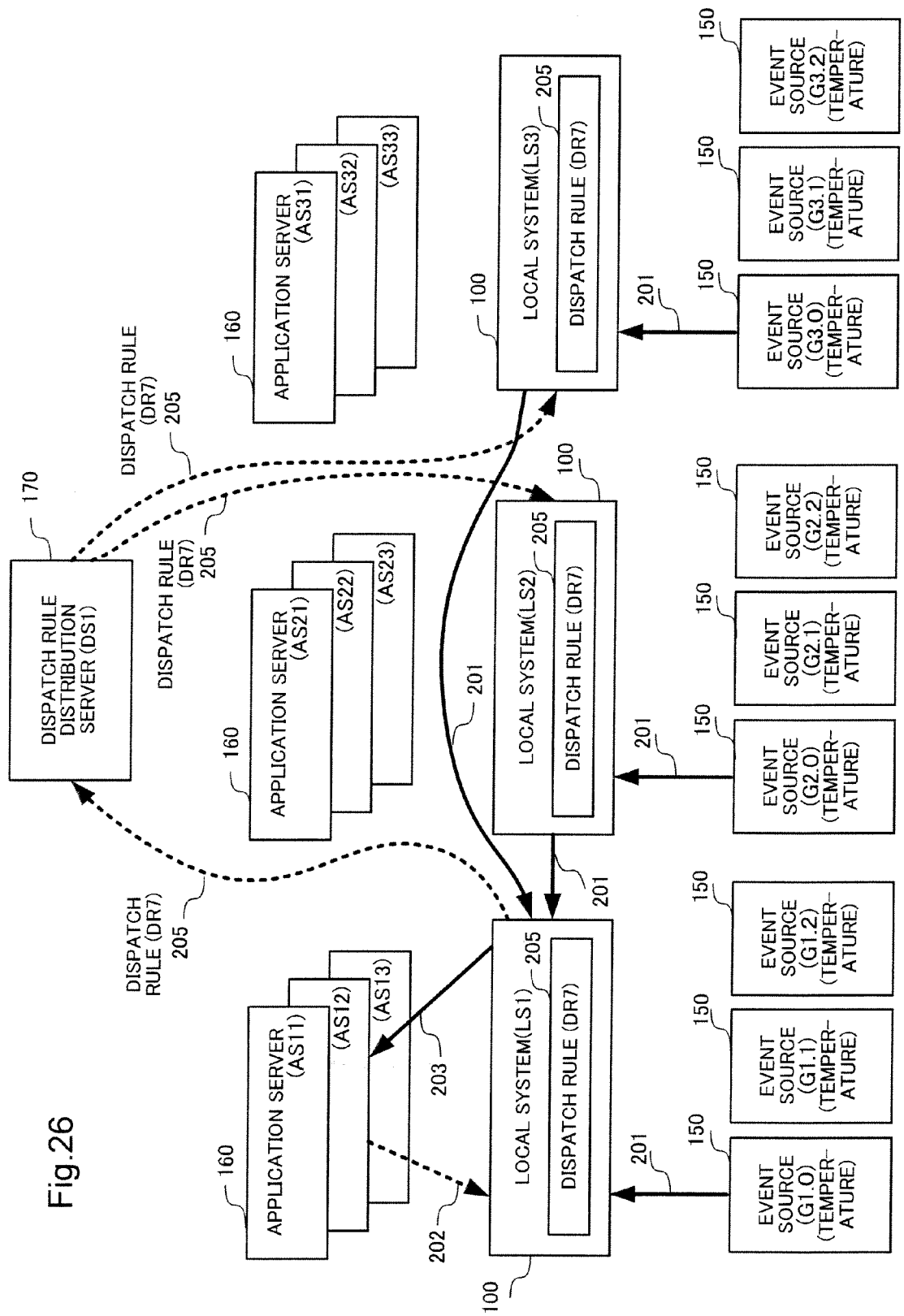
FIG. 26 A diagram showing an example of operation of an event processing system in the fourth embodiment of the present invention.

On the other hand, in case the dispatch rule 205 (DR7) of FIG. 24 is generated for the processing rule 202 (PR7) of FIG. 23, the event source 150 with the event source identifier=G*.0 is not limited to the event source 150 which sends the event 201 to own local system 100 (the event source 150 which is subordinate to other local system 100 is also included). Other local system 100 also receives the event 201 from the event source 150 with the event source identifier=G*.0. Accordingly, as shown in FIG. 26, the dispatch rule setting unit 114 sets the dispatch rule 205 (DR7) to the dispatcher 130 of own local system 100 (LS1) and, in addition, forwards it to the dispatch rule distribution server 170. The dispatch rule distribution server 170 forwards the dispatch rule 205 (DR7) to the local system 100 (LS2, LS3).

As a result, as shown in FIG. 26, the event 201 sent from the event sources 150 with the event source identifier=G*.0, which is subordinate to respective local systems 100 (LS1, LS2, LS3), is dispatched to the local system 100 (LS1), and the event processing result 203 is sent to the application server 160 (AS12).

This completes the operation of the fourth embodiment of the present invention.

As one application example of the fourth embodiment of the present invention, for example, there exists a meteorological observation system using a temperature sensor. In this case, the local system 100 is provided for each area, and the event source identifier=G*.0, is assigned to a temperature sensor of a representative point in the area and the event source identifier from G*.1 is assigned to a temperature sensor of each point in the area. The application server 160 designates the event source identifier=G1.* in the event condition of the processing rule 202 to collect a detailed temperature in area 1, and designates the event source identifier=G*.0 to collect a temperature in all areas roughly.

According to the fourth embodiment of the present invention, in the event processing system, a load of forwarding of the dispatch rule in the dispatch rule distribution server or a load of setting of the dispatch rule in the local system can be suppressed. The reason is because the dispatch rule setting unit 114 of the local system 100 forwards the dispatch rule 205 to the dispatch rule distribution server 170 in case there is a possibility that other local system 100 receives the event 201 with the event source identifier included in the event condition from the event source 150. Therefore, unnecessary dispatch rule 205 is not forwarded to the dispatch rule distribution server 170 and other local system 100.

Fifth Embodiment

Next, a fifth embodiment of the present invention will be described in detail with reference to drawings.

In the fifth embodiment of the present invention, a case in which the dispatch rule distribution servers 170 are provided hierarchically will be described.

In the fifth embodiment of the present invention, it differs from the third embodiment in a point that the dispatch rule distribution servers 170 are provided hierarchically, and moreover, the application server 160 designates a range in which the dispatch rule 205 is distributed within the hierarchy in the processing rule 202, and the local system 100 and the dispatch rule distribution server 170 forward the dispatch rule 205 based on the designated range.

Note that, in the fifth embodiment of the present invention, a component having the same reference number as the third embodiment is similar to the third embodiment unless otherwise described.

Figure 27:
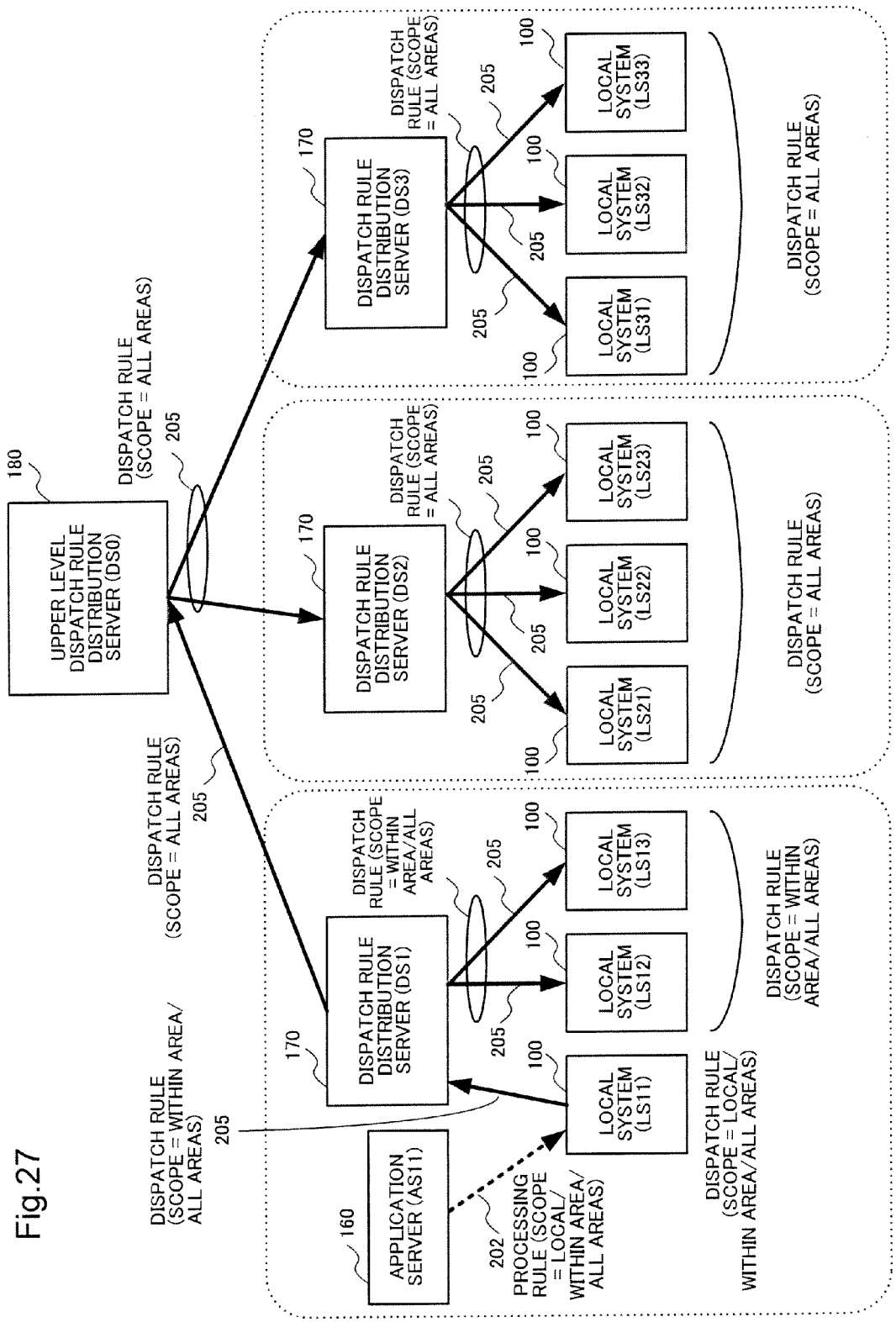
FIG. 27 A diagram showing a structure of a fifth embodiment of the present invention.

FIG. 27 is a diagram showing a structure of the fifth embodiment of the present invention. As shown in FIG. 27, in the fifth embodiment, an upper level dispatch rule distribution server 180 is provided. The upper level dispatch rule distribution server 180 performs forwarding of the dispatch rule 205 to the dispatch rule distribution server 170, which forwarding is similar to the forwarding performed by the dispatch rule distribution server 170. One upper level dispatch rule distribution server 180 is provided for a plurality of the dispatch rule distribution servers 170.

The processing rule 202 sent by the application server 160 includes a scope which designates a range within which the event 201 being a processing target is detected.

The dispatch rule setting unit 114 of the local system 100 includes the scope included in the processing rule 202 in the dispatch rule 205, when generating the dispatch rule 205. The rule distribution unit 110 of the local system 100 stores and manages forwarding rule information 209 in addition to the same structure as the rule distribution unit 110 in the third embodiment. As shown in FIG. 28, the forwarding rule information 209 includes information whether or not to forward to the dispatch rule distribution server 170 for the scope. The dispatch rule setting unit 114 refers to the forwarding rule information 209, and judges whether or not to forward the dispatch rule 205 to the dispatch rule distribution server 170 based on the scope.

Figure 30:
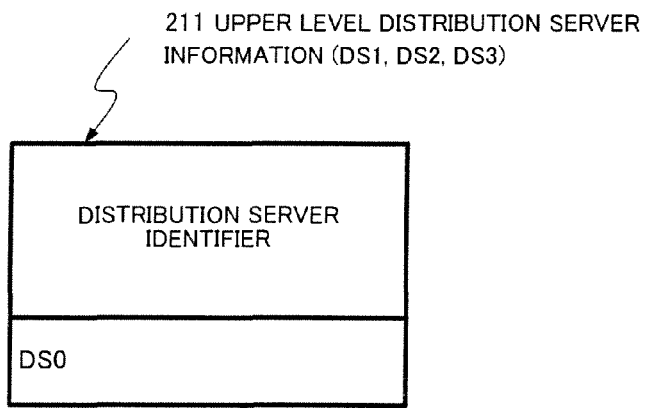
FIG. 30 A diagram showing an example of upper level distribution server information 211 in the fifth embodiment of the present invention.

The dispatch rule distribution server 170 stores and manages forwarding rule information 210 and upper level distribution server information 211 in addition to the same structure as the dispatch rule distribution server 170 in the third embodiment. As shown in FIG. 29, the forwarding rule information 210 includes information whether or not to forward to the upper level dispatch rule distribution server 180 for the scope. As shown in FIG. 30, the upper level distribution server information 211 includes a distribution server identifier of the upper level dispatch rule distribution server 180. The dispatch rule forwarding unit 171 refers to the forwarding rule information 210, and judges whether or not to forward the dispatch rule 205 which is received from the local system 100 to the upper level dispatch rule distribution server 180 based on the scope.

Figure 31:
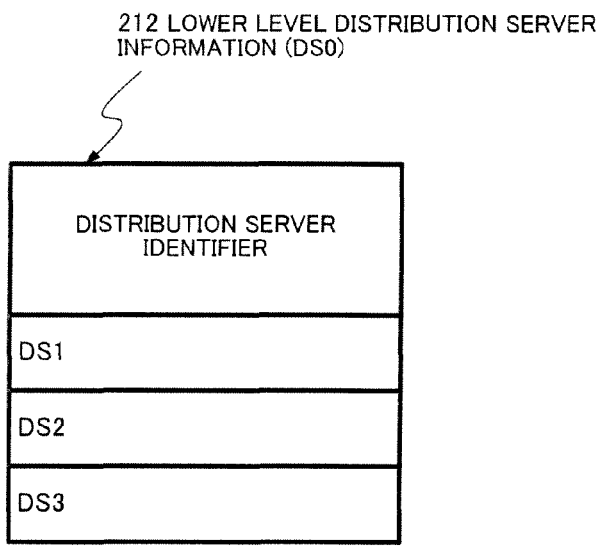
FIG. 31 A diagram showing an example of lower level distribution server information 212 in the fifth embodiment of the present invention.
Figure 32:
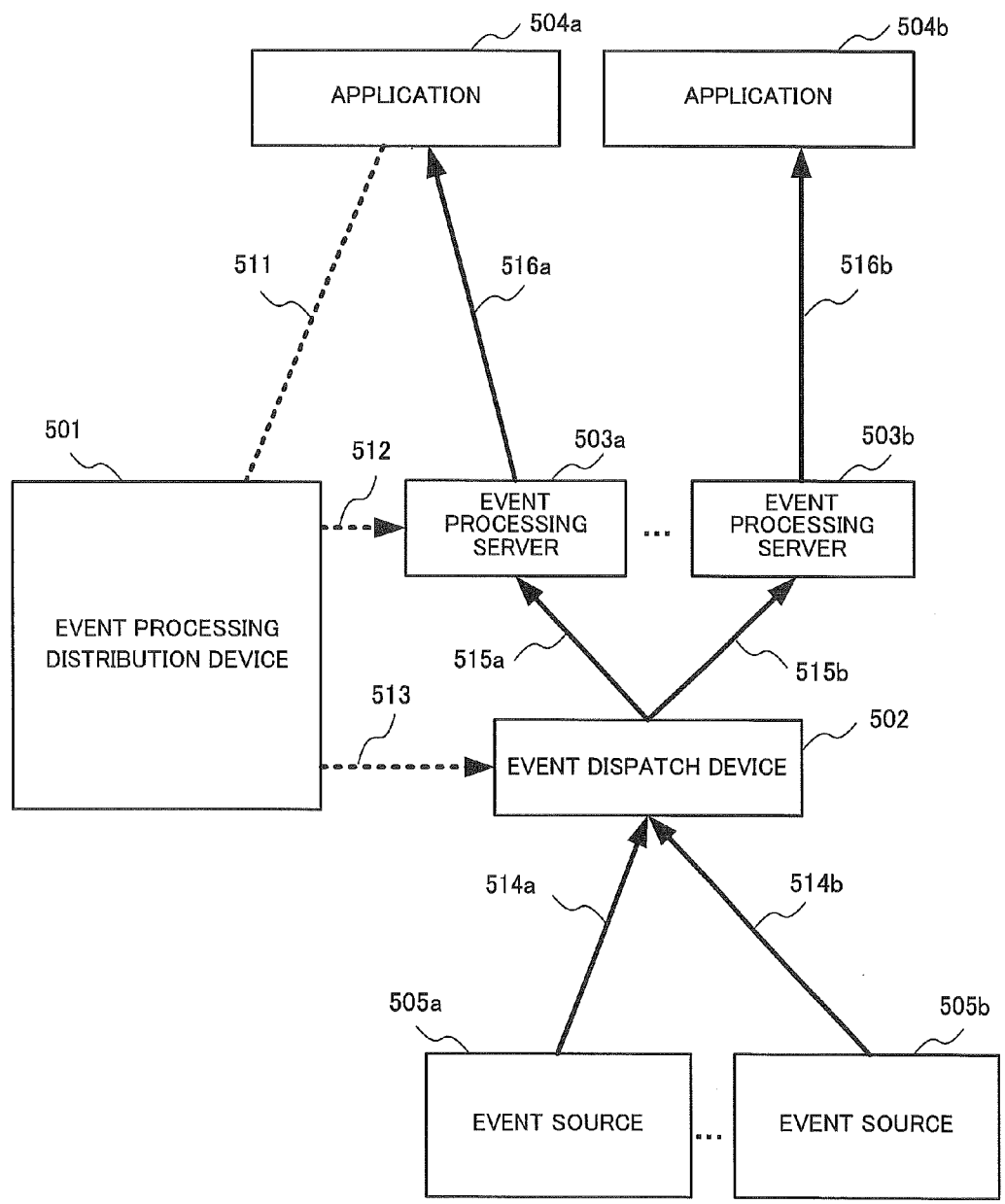
FIG. 32 A diagram showing a structure of a load distribution system of Japanese Patent Publication No. 4161998.

The upper level dispatch rule distribution server 180 stores and manages lower level distribution server information 212 in addition to the same structure as the dispatch rule distribution server 170 in the third embodiment. As shown in FIG. 31, the lower level distribution server information 212 includes a distribution server identifier of the dispatch rule distribution server 170 which is subordinate to the upper level dispatch rule distribution server 180. When the dispatch rule 205 is received from the dispatch rule distribution server 170, the upper level dispatch rule distribution server 180 forwards it to subordinate dispatch rule distribution server 170.

Next, operation of the fifth embodiment of the present invention will be described with reference to drawings.

When the local system 100 receives the processing rule 202 from the application server 160, the dispatch rule setting unit 114 generates the dispatch rule 205 including the scope. The dispatch rule setting unit 114 refers to the forwarding rule information 209, and judges whether or not to send the dispatch rule 205 to the dispatch rule distribution server 170 based on the scope.

For example, in case the forwarding rule information 209 of FIG. 28 is set, the dispatch rule setting unit 114 sets the dispatch rule 205 of scope=local to the dispatcher 130 of own local system 100, but does not forward it to the dispatch rule distribution server 170. The dispatch rule setting unit 114 sets the dispatch rule 205 of scope=within area and all areas to dispatcher 130 of own local system 100 and, in addition, forwards it to the dispatch rule distribution server 170.

When the dispatch rule distribution server 170 receives the dispatch rule 205 from the local system 100, the dispatch rule forwarding unit 171 refers to the forwarding rule information 210, and judges whether or not to forward the dispatch rule 205 which is received from the local system 100 to the upper level dispatch rule distribution server 180 based on the scope. In case of forwarding to the upper level dispatch rule distribution server 180, the dispatch rule forwarding unit 171 forwards the dispatch rule 205 to the upper level dispatch rule distribution server 180 which is designated by the upper level distribution server information 211.

For example, in case the forwarding rule information 210 of FIG. 29 is set, the dispatch rule forwarding unit 171 forwards the dispatch rule 205 of scope=within area to the local system 100 which is subordinate to own dispatch rule distribution server 170, but does not forward it to the upper level dispatch rule distribution server 180. The dispatch rule forwarding unit 171 forwards the dispatch rule 205 of scope=all areas to the local system 100 which is subordinate to own dispatch rule distribution server 170 and, in addition, forwards it to the upper level dispatch rule distribution server 180.

When the dispatch rule 205 is received from the dispatch rule distribution server 170, the upper level dispatch rule distribution server 180 refers to the lower level distribution server information 212 and forwards it to subordinate dispatch rule distribution server 170. Note that the upper level dispatch rule distribution server 180 may exclude the dispatch rule distribution server 170 which is the forwarding source of the dispatch rule 205 from the forwarding destination.

When the dispatch rule distribution server 170 receives the dispatch rule 205 from the upper level dispatch rule distribution server 180, the dispatch rule forwarding unit 171 forwards the dispatch rule 205 to the subordinate local system 100.

This completes the operation of the fifth embodiment of the present invention.

In the fifth embodiment of the present invention, although a hierarchy to distribute dispatch rule 205 has three levels including the local system 100, the dispatch rule distribution server 170 and the upper level dispatch rule distribution server 180, the hierarchy of the dispatch rule distribution server 170 may be further classified and have more levels. In that case, in addition to local/within area/all areas, areas according to the hierarchy can be defined as the scope (for example, in case the dispatch rule distribution servers 170 have two hierarchical levels, an upper level area and a lower level area are defined).

Also, in the fifth embodiment of the present invention, although local/within area/all areas are used as the scope based on the local system 100, it is also possible to designate a specific area or a specific local system 100 with the scope. In that case, in the forwarding rule information 209 and 210, the local system 100, the dispatch rule distribution server 170 or the upper level dispatch rule distribution server 180 which is a forwarding destination are designated for the scope. The local system 100 and the dispatch rule distribution server 170 can decide the specific local system 100 and dispatch rule distribution server 170 which is the forwarding destination based on the forwarding rule information 209 and 210.

As one application example of the fifth embodiment of the present invention, for example, there exists an international logistics management system using RFID. In this case, the local system 100 is provided for each company, the dispatch rule distribution server 170 is provided for domestic forwarding, and the upper level dispatch rule distribution server 180 is provided for international forwarding. For inventory management, event processing within own company can be performed within local system 100 of own company by setting the scope to local. For domestic logistics management, distribution and processing of the event 201 can be performed over local systems 100 including other domestic local system 100 by setting the scope to within area (domestic). For international logistics management, distribution and processing of the event 201 can be performed over local systems 100 including foreign local system 100, by setting the scope to all areas (international).

According to the fifth embodiment of the present invention, in the event processing system, a load of forwarding of the dispatch rule in the dispatch rule distribution server can be suppressed. The reason is because, the dispatch rule distribution server 170 is provided hierarchically, and forwarding of the dispatch rule 205 between the dispatch rule distribution servers 170 is performed via the upper level dispatch rule distribution server 180.

Also, according to the fifth embodiment of the present invention, in the event processing system, a load of forwarding of the dispatch rule in the dispatch rule distribution server and a load of setting of the dispatch rule in the local system 100 can be suppressed. The reason is because the application server 160 designates the range within which the dispatch rule 205 is distributed in the processing rule 202, and the local system 100 and the dispatch rule distribution server 170 forward the dispatch rule 205 based on the designated range. Therefore, unnecessary dispatch rule 205 is not forwarded to the dispatch rule distribution server 170 or local system 100.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2008-318067, filed on Dec. 15, 2008, the disclosure of which is incorporated herein in its entirety by reference.

INDUSTRIAL APPLICABILITY

The present invention can be applied to an event processing system which processes a large number of events generated in a device such as RFID or a sensor. For example, the present invention can be applied to a logistics traceability system using an event from RFID or a sensor, SCEM (Supply Chain Event Management) system and a management system of environment such as weather or disaster.

What is claimed is:

1. An event processing system comprising:
   a plurality of local systems each of which receives an event from an event source and sends a processing result of said event to an application server; and
   a dispatch rule distribution server which distributes a dispatch rule to said local systems,
   wherein each local system of said plurality of local systems:
       when receiving a processing rule including processing contents and an event condition which indicates a condition of said event to be processed from said application server, generates said dispatch rule including said event condition and the local system as a dispatch destination of said event which matches said event condition and sends said dispatch rule to said dispatch rule distribution server,
       when receiving said event which matches said event condition included in said dispatch rule received from said dispatch rule distribution server from said event source, dispatches said event to an other local system of the plurality of local systems in case said dispatch destination corresponding to said event condition is not the local system, and
       when receiving said event of which said dispatch destination included in said dispatch rule is the local system from said event source or the other local system, processes said event according to said processing contents and notifies said application server which is a sender of said processing rule of a processing result of said event, and
   wherein said dispatch rule distribution server, when receiving said dispatch rule from the local system of said plurality of local systems, forwards said dispatch rule to the other local system of said plurality of local systems.

2. The event processing system according to claim 1, wherein each of said plurality of local systems includes:
   a rule distribution unit which performs setting of said processing rule to a processing server, generation of said dispatch rule, setting of said generated dispatch rule to a dispatcher, and sending of said generated dispatch rule to said dispatch rule distribution server;
   at least one said processing server which processes said event which matches said event condition included in said processing rule according to said processing contents; and
   at least one said dispatcher which, when receiving said event which matches said event condition included in said dispatch rule from said event source, dispatches said event to said processing server of the other local system in case said dispatch destination corresponding to said event condition is not the local system,
   wherein said rule distribution unit includes:
       a processing rule setting unit which, when receiving said processing rule from said application server, sets said processing rule to one of said processing servers of the local system; and
       a dispatch rule setting unit which generates and sends said dispatch rule including said processing server to which said processing rule is set as said dispatch destination of said event which matches said event condition to said dispatch rule distribution server, and sets said generated dispatch rule or said dispatch rule received from said dispatch rule distribution server to said dispatcher.

3. The event processing system according to claim 2, wherein said rule distribution unit further includes event source management information including attribute information of said event which has a possibility to be received from said event source, and
   wherein said dispatch rule setting unit refers to said event source management information and sets said dispatch rule to said dispatcher in case there is a possibility to receive said attribute information which matches said event condition included in said dispatch rule from said event source.

4. The event processing system according to claim 2, wherein said dispatch rule setting unit refers to an event source identifier included in said event condition and sends said dispatch rule to said dispatch rule distribution server in case there is a possibility that the other local system receives said event with said event source identifier from said event source.

5. The event processing system according to claim 1, wherein said dispatch rule distribution server includes local system management information including attribute information of said event which has a possibility that each local system of the plurality of local systems receives from said event source, and
   wherein said dispatch rule distribution server, when receiving said dispatch rule, refers to said local system management information and forwards said dispatch rule to said local system in case there is a possibility that each said local system receives said attribute information which matches said event condition included in said dispatch rule from said event source.

6. The event processing system according to claim 1 further comprising an upper level dispatch rule distribution server which forwards said dispatch rule among a plurality of said dispatch rule distribution servers,
   wherein each of said plurality of dispatch rule distribution servers:
       when receiving said dispatch rule from each said local system, forwards said dispatch rule to an other local system of the plurality of local systems being subordinate and said upper level dispatch rule distribution server,
       when receiving said dispatch rule from said upper level dispatch rule distribution server, forwards said dispatch rule to said local system being subordinate, and said upper level dispatch rule distribution server, and
       when receiving said dispatch rule from each said dispatch rule distribution server, forwards said dispatch rule to other said dispatch rule distribution server being subordinate.

7. The event processing system according to claim 1, wherein said processing rule received from said application server includes a range within which said dispatch rule is distributed, wherein said local system generates said dispatch rule including said range and determines a forwarding destination of said dispatch rule based on said range, and wherein said dispatch rule distribution server determines a forwarding destination of said dispatch rule based on said range.

8. An event processing system comprising:

a plurality of local systems; and a dispatch rule distribution server which distributes a dispatch rule to said local systems, wherein a first local system among said plurality of local systems:

when receiving a processing rule including processing contents and an event condition which indicates a condition of an event to be processed from an application server, generates said dispatch rule including said event condition and said first local system as a dispatch destination of said event which matches said event condition and sends said dispatch rule to said dispatch rule distribution server, and when receiving said event of which said dispatch destination included in said dispatch rule is said first local system from a second local system among said plurality of local systems, processes said event according to said processing contents and notifies said application server which is a sender of said processing rule of a processing result of said event, wherein said second local system, when receiving said event which matches said event condition included in said dispatch rule received from said dispatch rule distribution server from an event source, dispatches said event to said first local system being said dispatch destination which corresponds to said event condition, and wherein said dispatch rule distribution server, when receiving said dispatch rule from said first local system, forwards said dispatch rule to said second local system.

9. A rule distribution device in a local system including a processing server and a dispatcher, the rule distribution device comprising:

a processing rule setting unit which, when receiving a processing rule including an event condition which indicates a condition of an event to be processed from an application server, sets said processing rule to the processing server in the local system which processes the event according to the processing rule; and a dispatch rule setting unit which generates and sends a dispatch rule including said event condition and said processing server to which said processing rule is set as a dispatch destination of said event which matches said event condition to a dispatch rule distribution server, and sets said generated dispatch rule or said dispatch rule received from said dispatch rule distribution server to the dispatcher in the local system which dispatches the event according to the dispatch rule, wherein when the dispatch rule distribution server receives the dispatch rule from the local system, the dispatch rule distribution server forwards the dispatch rule to an other local system.

10. The rule distribution device according to claim 9, further comprising event source management information including attribute information of said event which has a possibility that said dispatcher receives from an event source, wherein said dispatch rule setting unit refers to said event source management information and sets said dispatch rule to said dispatcher in case there is a possibility that said dispatcher of the local system receives said attribute information which matches said event condition included in said dispatch rule from said event source.

11. The rule distribution device according to claim 9, wherein said dispatch rule setting unit refers to an event source identifier included in said event condition and sends said dispatch rule to said dispatch rule distribution server in case there is a possibility that said dispatcher of the other local system receives said event with said event source identifier from said event source.

12. An event processing method comprising:

in a local system, when receiving a processing rule including processing contents and an event condition which indicates a condition of an event to be processed from an application server, generating a dispatch rule including said event condition and the local system as a dispatch destination of said event which matches said event condition and sending said dispatch rule to a dispatch rule distribution server;

in said dispatch rule distribution server, when receiving said dispatch rule from the local system of a plurality of said local systems, forwarding said dispatch rule to an other local system;

in said local system, when receiving said event which matches said event condition included in said dispatch rule received from said dispatch rule distribution server from said event source, dispatching said event to the other local system in case said dispatch destination corresponding to said event condition is not the local system; and in said local system, when receiving said event of which said dispatch destination included in said dispatch rule is the local system from said event source or the other local system, processing said event according to said processing contents and notifying said application server which is a sender of said processing rule of a processing result of said event.

13. The event processing method according to claim 12, further comprising:

in a rule distribution unit of said local system, when receiving said processing rule from said application server, setting said processing rule to a processing server of the local system, generating said dispatch rule including said processing server to which said processing rule is set as said dispatch destination of said event which matches said event condition, setting said generated dispatch rule to a dispatcher, and sending said generated dispatch rule to said dispatch rule distribution server;

in said rule distribution unit of said local system, when receiving said dispatch rule from said dispatch rule distribution server, setting said received dispatch rule to said dispatcher;

in said dispatcher of said local system, when receiving said event which matches said event condition included in said dispatch rule from said event source, dispatching said event to said processing server of the other local system in case said dispatch destination corresponding to said event condition is not the local system; and in said processing server of said local system, when receiving said event which matches said event condition included in said processing rule, processing said received event according to said processing contents.

14. The event processing method according to claim 13, further comprising:

in said rule distribution unit of said local system, when generating or receiving said dispatch rule, referring to event source management information including attribute information of said event which has a possibility to be received from said event source, and setting said dispatch rule to said dispatcher in case there is a possibility to receive said attribute information which matches said event condition included in said dispatch rule from said event source.

15. The event processing method according to claim 13, further comprising:
in said rule distribution unit of said local system, when generating said dispatch rule, referring to an event source identifier included in said event condition, and sending said dispatch rule to said dispatch rule distribution server in case there is a possibility that the other local system receives said event with said event source identifier from said event source.

16. The event processing method according to claim 12, further comprising:
in said dispatch rule distribution server, when receiving said dispatch rule, referring to local system management information including attribute information of said event which has a possibility that each local system of the plurality of local systems receives from said event source, and forwarding said dispatch rule to said local system in case there is a possibility that each said local system receives said attribute information which matches said event condition included in said dispatch rule from said event source.

17. The event processing method according to claim 12, further comprising:
in said dispatch rule distribution server, when receiving said dispatch rule from each said local system, forwarding said dispatch rule to the other local system being subordinate and an upper level dispatch rule distribution server;
in said upper level dispatch rule distribution server, when receiving said dispatch rule from each said dispatch rule distribution server, forwarding said dispatch rule to other said dispatch rule distribution server being subordinate; and
in said dispatch rule distribution server, when receiving said dispatch rule from said upper level dispatch rule distribution server, forwarding said dispatch rule to said local system being subordinate.

18. The event processing method according to claim 12, wherein said processing rule received from said application server includes a range within which said dispatch rule is distributed, the method further comprising:
in said local system, when generating said dispatch rule, generating said dispatch rule including said range and determining a forwarding destination of said dispatch rule based on said range; and
in said dispatch rule distribution server, when forwarding said dispatch rule, determining a forwarding destination of said dispatch rule based on said range.

19. A non-transitory computer readable medium recording thereon a rule distribution program to allow a rule distribution device in a local system including a processing server and a dispatcher, to function as:
a processing rule setting unit which, when receiving a processing rule including an event condition which indicates a condition of an event to be processed from an application server, sets said processing rule to the processing server in the local system which processes the event according to the processing rule; and
a dispatch rule setting unit which generates and sends a dispatch rule including said event condition and said processing server to which said processing rule is set as a dispatch destination of said event which matches said event condition to a dispatch rule distribution server, and sets said generated dispatch rule or said dispatch rule received from said dispatch rule distribution server to the dispatcher in the local system which dispatches the event according to the dispatch rule,
wherein when the dispatch rule distribution server receives the dispatch rule from the local system, the dispatch rule distribution server forwards the dispatch rule to an other local system.

20. The non-transitory computer readable medium recording thereon said rule distribution program according to claim 19, wherein said dispatch rule setting unit refers to event source management information including attribute information of said event which has a possibility that said dispatcher receives from an event source, sets said dispatch rule to said dispatcher in case there is a possibility that said dispatcher of the local system receives said attribute information which matches said event condition included in said dispatch rule from said event source.

21. The non-transitory computer readable medium recording thereon said rule distribution program according to claim 19, wherein said dispatch rule setting unit refers to an event source identifier included in said event condition and sends said dispatch rule to said dispatch rule distribution server in case there is a possibility that said dispatcher of the other local system receives said event with said event source identifier from said event source.

22. An event processing system comprising:
a dispatch rule distribution server which distributes a dispatch rule; and
a plurality of local systems in which:
when a local system of the plurality of local systems receives a processing rule including an event condition which indicates a condition of an event to be processed, the local system generates the dispatch rule including an identifier of the local system as a dispatch destination of an event which matches said event condition and forwards said dispatch rule to an other local system of the plurality of local systems via the dispatch rule distribution server; and
when the local system receives an event, forwards said received event to the other local system according to said dispatch rule or processes said received event according to said processing rule.

* * * * *